(12) United States Patent
Valbuena

(10) Patent No.: US 9,153,145 B2
(45) Date of Patent: Oct. 6, 2015

(54) KIT OF BUILDING BLOCKS FOR CONSTRUCTING EDUCATIONAL ELECTRONIC CIRCUITS

(76) Inventor: Pablo Valbuena, Madrid (ES)

( * ) Notice: Subject to any disclaimer, the term of this patent is extended or adjusted under 35 U.S.C. 154(b) by 442 days.

(21) Appl. No.: 13/515,622

(22) PCT Filed: Dec. 15, 2010

(86) PCT No.: PCT/ES2010/070830
§ 371 (c)(1),
(2), (4) Date: Aug. 9, 2012

(87) PCT Pub. No.: WO2011/073485
PCT Pub. Date: Jun. 23, 2011

(65) Prior Publication Data
US 2013/0029305 A1    Jan. 31, 2013

(30) Foreign Application Priority Data
Dec. 16, 2009    (EP) .................................... 09382281

(51) Int. Cl.
*G09B 1/00*    (2006.01)
*G09B 23/18*    (2006.01)

(52) U.S. Cl.
CPC ............ *G09B 23/185* (2013.01); *G09B 23/183* (2013.01)

(58) Field of Classification Search
USPC ......................................................... 434/379
See application file for complete search history.

(56) References Cited

FOREIGN PATENT DOCUMENTS

WO       WO 9825253 A1 *  6/1998   ............. G09B 23/18

* cited by examiner

*Primary Examiner* — Xuan Thai
*Assistant Examiner* — James Hull

(57) ABSTRACT

Kit of building blocks for constructing educational electronic circuits comprising a ferromagnetic base plate (10) with the diagram (21) of the circuit to construct. A transparent plastic sheet (30) covers the diagram. A group of magnets (40, 41) rest on the plastic sheet attracted by the plate (10). The surface of the magnets (40, 41) is electrically conducting. A plurality of building blocks can be detachably mounted on the magnets (40, 41), each magnet (41) connecting the steel sheets (702) of the building blocks that rest on it. The steel sheets of the blocks are designed so that the attraction forces that arise between the magnets and the sheets drive the modules exactly to a desired equilibrium position.

12 Claims, 17 Drawing Sheets

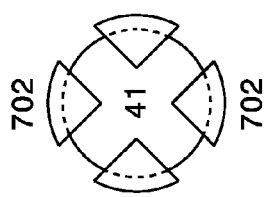
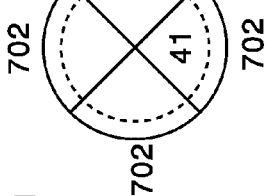
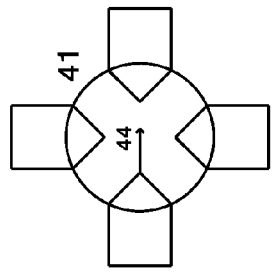
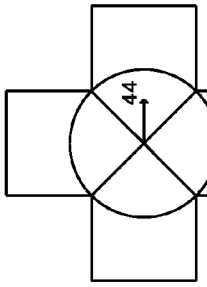
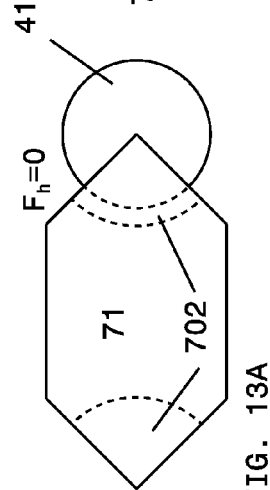
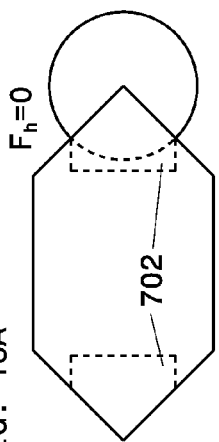
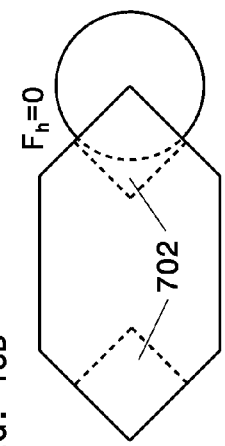
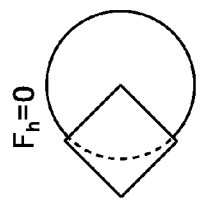
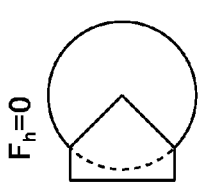
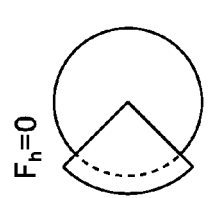
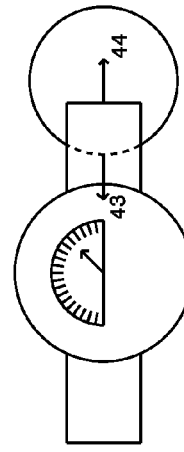
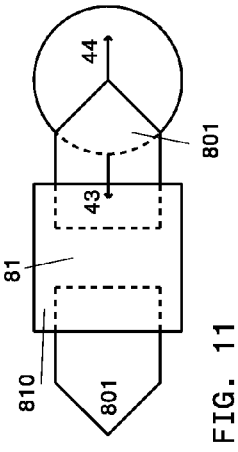
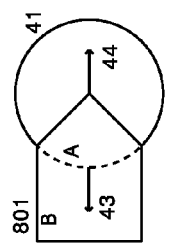
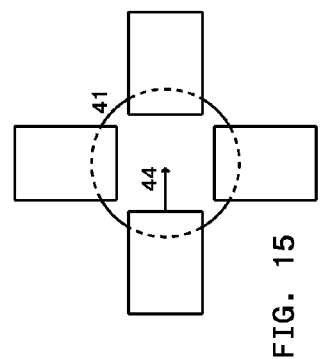

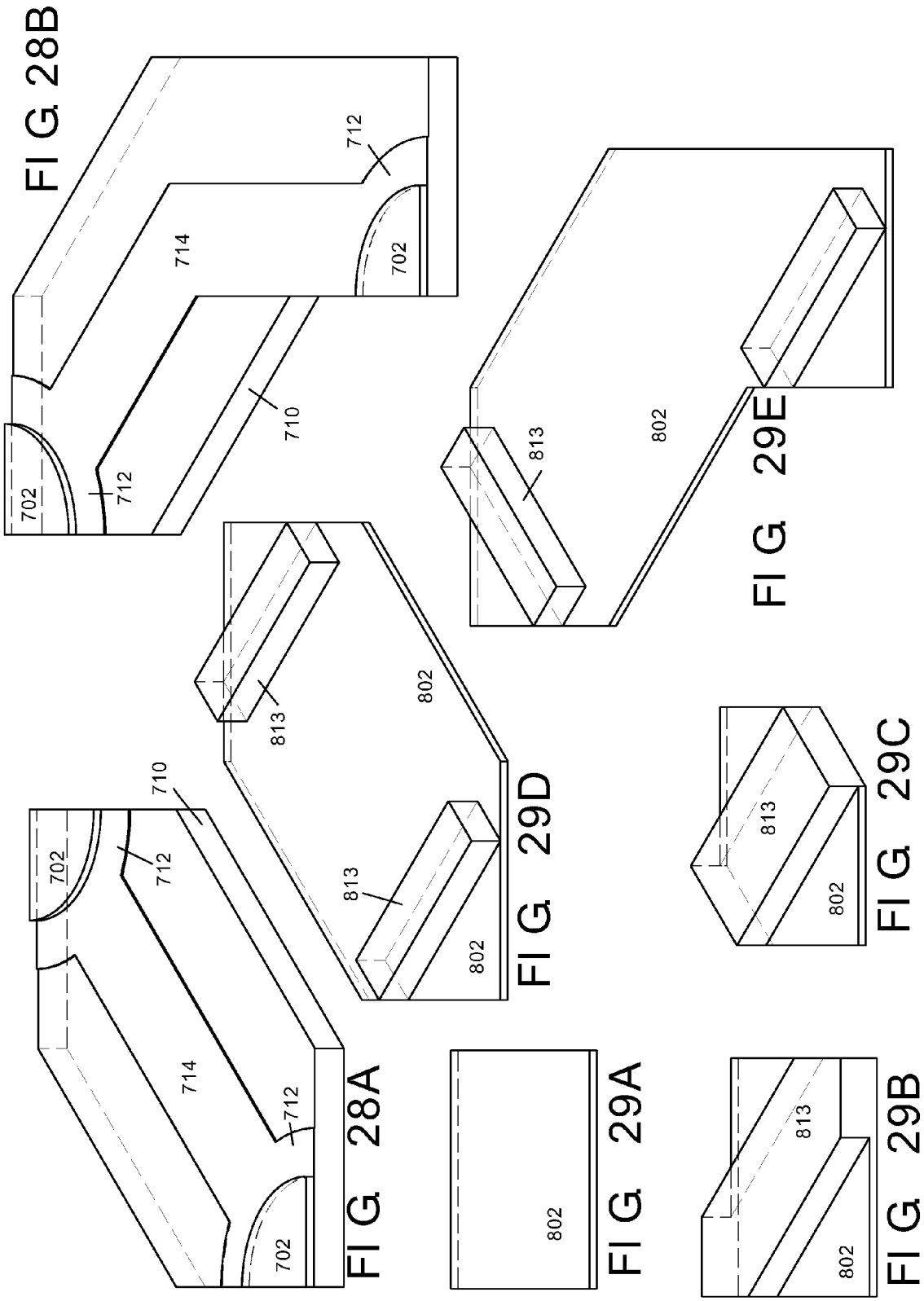

KIT OF BUILDING BLOCKS FOR CONSTRUCTING EDUCATIONAL ELECTRONIC CIRCUITS

1. FIELD OF TECHNOLOGY

The kit that is presented forms part of educational games that physically and actually construct electronic circuits from interchangeable electronic modular elements. These units are joined together over a base panel that serves as support to the whole unit. The systems mentioned are clearly differentiated from other educational systems which use a computer to simulate circuits.

2. BACKGROUND ART

Several systems are known in the art for learning electronics by setting-up circuits; below can be found a classification of the most important ones following the excellent topological analysis made by Mr. Reinhard Niehoff in his website called Erinacom.

2.1. Classification of the Known Systems 2.1.1. Systems in which the Connections Among Elements is Done through Cables (Verdrahtungssysteme in German).

In these systems the base panel solely accomplishes the function of supporting the modular pieces; the panel does not have any electrical function. Among these we can distinguish:

2.1.1.1. Open systems (Offenes Verdrahtungssystem): in these, the modular elements to be used are chosen from a "warehouse" and are fixed to the panel. The selected elements are later on connected through cables, wires, etc. In many of these systems the electronic components are fixed to small non-conductive cassette decks; this protects the components and makes them easier to use. Devices can be fixed to these cassette decks as a bridge between the leads of the electronic components and the cables that make the connections among decks. Normally, devices that allow connection of more than one cable with a component lead are used to achieve electric contact. Typical systems are those that use clamps (Klemmen in German), or plugs and sockets. When substitution of one element with another is desired, the element is simply disconnected and replaced with the new element, and once again the electric connections are to be done. An advantage of this system is that the elements can be easily laid out either very far or very near from the others. This can be interesting, for example, if one wants to minimize electromagnetic emissions or adapt it to a very large space, respectively. Notable examples of open systems are, among others, the Radiomann system of the German enterprise Kosmos. Initially, the contacts were done with clamps of screws and, later on, with clamps of flexible metal sheets. This system was available from 1934 until approximately 1972, when the Kosmotronik system was introduced and, later on, Electric X, which are characterized by a different set-up method: a network of straps. Another system of this type is that of another German enterprise, Busch.

2.1.1.2. Closed systems (Geschlossenes Verdrahtungssystem): in these systems all the electronic components are fixed in an irremovable way to a panel. Next to each component are also fixed the means to connect the component to the interconnection cables. These connection means are permanently joined together to the leads of the electronic components. To achieve a circuit, one simply makes the necessary connections. The advantage of this system is that the components never get lost; the main disadvantage is that once the assembly has been done, it is very difficult to distinguish the electrical plan and understand its operation. Oftentimes the cables form a genuine puzzle and one easily commits errors. Another disadvantage is that many of the connections have to be made with long cables since the components are distant from each other. Still another negative factor is that the components cannot be increased, the assemblies have to be necessarily set up with the parts that come with it from its manufacturing.

2.1.2. Contact network systems (Knotenraster): in these systems the contacts among the different elements are not done through cable but rather they are done in specific places of the contact network that the panel has. That is, in these systems the panel does not only undertake a support function but also an electrical function. The contact network of the panel can take different forms and the contacts done through varied means (clamps, springs, clips, screws, etc.). The contact network systems are undoubtedly the most elegant, above all, because the assemblies are very visual and look like the circuit diagram. Another advantage is that it is very easy to substitute an element with that of another of the same family but of different value. There are different types of contact networks and below are mentioned the more important ones:

2.1.2.1. Network of contact points (Einfache Knotenraster): This system is also known as grid of contacts. This is the simplest and most basic network. It consists of establishing a network of contacts in the panel, in each one of which it is possible to connect one or various leads of the electronic components. In this way, when two or more leads coincide in one point, the leads become connected. In the network of contact points, the connections occur when two or more leads come in direct contact with each other. What the springs, clamps, etc. do is press together the leads. In order to achieve a network system of contact points, some preliminary conditions should be present. In the first place, the contact points should be made with parts that accept leads, cables, wires, etc. that accede the point from any direction. This is the purpose served, for example, of the springs placed in a vertical position with respect to the panel or the clamps (Klemmen in German). In the second place, the electronic components should be adequate; among others, the electronic components of the SMD type (Surface Mounted Device) are of no use because they do not have any leads. Of no use either are components with short leads that do not manage to reach two adjacent points in the contact network, or components so big that they exceed the distance between two adjacent points in the contact grid. One of the most representative examples of the system of contact points is the Philips system which dominated the sector between the years 1963 and 1983 approximately. What is most distinctive in the Philips system are the springs with which the contacts are done. These springs consist of two parts: a fastener that is introduced through the rear side of the perforated panel, and the spring itself, which surrounds the fastener in the front side of the panel. The spring pushes down the cables introduced by the fastener creating in that manner electrical contact. Although in the Philips system springs are placed only on determined points of the grid, this detail does not alter its operating principle, in such a way that this method can be perfectly classified under this present section.

2.1.2.2. Network of crosses (Kreuzknotenraster): in the network of crosses there is no direct contact between leads. Each lead of a component touches a single contact, and each contact touches only a lead, or none. Electrical connection between leads is achieved because the contacts are joined together inside or over the panel. Usually, the contacts are grouped into groups of four. These groups, depending on the system, form a cross, a square, lines, etc. In these networks, the leads of the components are usually not found in a parallel plane to the panel but rather the leads are usually found perpendicular to the panel. The circuits done with these networks are simple and easy to manage. However, it is a system that requires a lot of space, above all for the components which have more than two contacts. The cross system, given the large space it needs, is used above all in the professional sector, such as in schools and universities, and more concretely, to put up assemblies in front of a class, as a demonstration. The usual contacts used are the typical banana connector of 4 mm.

2.1.2.3. Network of squares (Quadratknotenraster): this system is similar to the prior one. Their only difference lies in the groups of contacts, whereas before they were a cross, now they are squares. This is achieved simply by rotating the groups 45°. This difference has at least one major consequence: now each contact can accept both horizontal as well as vertical units. This allows the parts to be placed in a more versatile way and occupy lesser space. On the other hand, the assemblies lose some of the clarity that they had in the cross network. A very common example of this type of system is the Spanish system Scatron. The details of this can be found in the patent document number ES 445733 A1.

2.1.2.4. Network of strips of contacts (Streifenraster): here the contacts are placed in a linear manner, either horizontal or vertically. The number of contacts in each strip varies from one system to another, but the usual number is that of four or five. As examples of this system we can cite that of "Electronic XN" and "Electronic X", of the German enterprise Kosmos.

2.1.2.5. Breadboards: the network of strips of contacts reminds us very much of the breadboards that are found in electronic shops. These boards are usually formed by rows of five contacts and not of four. These rows are very close to each other, the usual distance is that of 2.54 mm, 0.1 inches, which is the standard distance of the pins of integrated circuits. In this way, the integrated circuits can be directly plugged to the board without using any type of adapter. It is important to note that these boards are rather a base to place the components, with an almost one-dimensional layout, unlike the networks that we have been referring to, which have a two-dimensional character. In order to achieve a two-dimensional network with these assembly boards, it is necessary to use more than one board and place them side by side. In these boards it is necessary to use many cables to connect the components that are distant from each other. This is a very usual practice and it can almost be said that even if they geometrically form part of the network of contacts systems, in reality they are a cabled system. Just like in the cabled systems, the assemblies done over these boards are very difficult to follow and distinguish. Nonetheless, they do have some clear advantages, such as that the assemblies occupy very little space, or that integrated circuits can be connected directly.

2.1.2.6. Hook-up network (Kopplungsraster): in the networks mentioned up to the moment, each group normally presented four contacts. However, in the hook-up network, each group makes use of only two contacts hence each group allows only the communication of two leads or pins of electronic components. If a ramification needs to be done, special parts need to be connected. The main disadvantage of this system is the cost and the large space necessary for its assembly. A famous example of this type is the Lectron system. In this system the contacts are not done in the panel, but rather take place in the adjacent sides of the parts where the electronic components are contained. The containers are cubical and the contacts take place in the adjacent sides of the cubes which aside from having a metallic side also have magnets so that contact can be easily done.

2.1.3. Ideal Characteristics:

Each one of the previous systems has advantages and disadvantages. It seems difficult to find a system that fully complies with all the ideal requirements, which could be the following: That the circuit assembled over the panel be easy to distinguish visually. There are systems wherein once the circuit has been assembled, although it may function, is difficult to visually distinguish the path of the current and appreciate its topology. A quick, simple and intuitive delineation is fundamental in order to capture what the circuit wants to show. This is also very important for distinguishing errors and for comparing the assembly with the model that comes with the instructions.

That the Circuit be Easy to Assemble Following the Enclosed Circuit Diagram:

This point is related to the previous one. When the one that is assembling the circuit does not understand well its functioning, it has to follow the diagram which comes with the assembly instructions. The clearer the graphical representation of the assembly to be done, the easier will be its execution.

That Free Circuits be Easy to Assemble:

Free circuits should be easy to build. Free circuits are those devised by the user. If, in order to assemble one's own circuit, it is necessary to embark on a thorough prior planning, it is possible that such difficulty will hamper the creative and experimental inclinations of the beginner. This is very crucial when there is a need to make some corrections or modifications to the topology.

That Some Elements can be Easily Substituted with Another:

When one is learning electronics or experimenting with new circuits, it is essential that an element can be easily changed with another of different magnitude; this applies to resistors, condensers, inductances, etc.

That the Assemblies Occupy Little Space:

The more compact the assemblies, the less space they occupy, the more complex the circuits that can be assembled in a specific panel. For the same purpose, the less space the assemblies occupy, the lesser the size needed for the panel, and hence, the lesser the space to be occupied by the educational system, game or learning device.

That the Electronic Components be Well Identified:

It is important that the legends or labels of the different units or parts be easy to read. This is essential in order to choose the correct parts and also to understand well the circuit once it has been assembled.

2.1.4. Framework of the Proposed System

Taking into account the previous classification, the system being proposed would topologically be a network of contacts system. Specifically it is about a network of contact points, or a grid of contacts. The contact points are done through magnets with a conductive surface. These magnets are attached to a ferromagnetic panel in specific points of the grid. When the ferromagnetic contact plates of the building blocks coincide in the surface, this gives rise to an electric contact. In each contact point, four different contact plates can coincide, each one from a building block. The plates that meet at one contact point are separated 90° from each other. Similarly to what occurs in the Philips system already mentioned, the grid in this case does not count with a magnet in each point in a fixed way but rather magnets are placed where a contact needs to be done, according to the circuit referred to. In this manner the number of magnets that the system should consist of is reduced, making the product cheaper. The invention can also be considered as a network of crosses since even if the contacts are done in the magnetic surface, which is similar to a point, in general there is no direct plate-to-plate contact but rather the most usual manner of contact is plate-magnet-plate.

2.2. Most Related Documents

What we have done up to this point is to make a general description of the background art. Below follows a commentary of two documents that are considered most related to the proposed invention.

Systems that fix components to a metallic ferromagnetic base with the use of magnets are known in the art. Two documents which are considered most related to the present invention are the French document FR 2412128 A1 of the company Telemecanique Electrique, published on Jul. 13, 1979, and the document WO 98/25253 A1 of L. Black et al., published on Jun. 11, 1998.

2.2.1. Document FR 2412128 A1 offers a system with which to teach Electronics by assembling simple electric circuits. The system is designed for the use of large instruments, such as analogical ammeters and voltmeters, lamps, switches, etc. The components are attached to a ferromagnetic panel which is placed in a vertical or inclined position which can be shown to a class of students. The components are attached to the panel through ferrite magnets. Given that ferrite is not a conductive element, the magnets have a small copper covering on the surface which does not have any contact with the panel, that is, in the surface that the electric components touch. The components are attached to the magnets through ferromagnetic steel sheets which serve the purpose of mechanical fixation and also of electrical connection. When two or more steel sheets of two or more components coincide on the copper covering of the magnet, an electrical union occurs. There are also steel sheets which electrically connect magnets but do not form part of any component. That is, these steel sheets serve the purpose of an electric jumper.

2.2.2. The document WO 98/25253 A1 shows a system to construct electrical and electronic circuits for educational purposes. The system is very similar to the one illustrated by the French document mentioned before: it comprises a ferromagnetic base plate on top of which some magnetic strips are fixed. These strips have a conductive layer on the upper side. This layer can be a coating or a metallic sheet. In a preferred embodiment the layer is a conducting adhesive strip of copper or tinned copper. Similar to the French document, the magnetic strips can be connected by conducting plates or by components. The permanent magnets have a mechanical function and at the same time an electrical function, since they electrically connect the different components that meet in them. The electrical or electronic components are mounted on an insulating base and are electrically connected to steel rivets that go through the insulating base. These steel rivets are the ones that make the contact with the conducting layer of the permanent magnets due to the attraction force that arises between them.

In a preferred embodiment, the leads of the components go through the insulating base across perforations that in the opposite side are surrounded by a copper pad connected to a copper track. These copper tracks connect each component lead with the copper pad of a rivet. The assembly is wave soldered. The rivets are fixed after soldering to make an electrical connection with the copper track.

Alternatively, the insulating base of each electronic component may be surfaced on its underside with strips of conductive material which are connected to the component.

3. EXPLANATION OF THE INVENTION AND TECHNICAL PROBLEM POSED

As it has been mentioned before, there are still in the market some systems to learn electronics through the mounting of circuits. However, these systems have been notably pushed into the background by simulation programs that run in a computer. Germany is probably one of the countries that had, and keeps having, the widest offer of such systems. In many other countries those educational kits are almost unknown. In Spain maybe the most popular kit was one named Scatron. This kit reached its height in the mid 80's and was manufactured by the company Scala S.A.; today it is a minority educational resource.

It is an object of the proposed system to overcome all the technical problems listed ahead. Those problems are the cause why educational kits are now relegated to a secondary place. It is worth the effort because no matter how well a computer might simulate, it is always more instructive to build real circuits. The experience of constructing a radio, for example, is something that young students will never forget.

3.1. Problems that All the Kits to Teach Electronics have in Common

The Cost of the Systems:

Students nowadays are not willing to spend 40 or 100 Euros to buy a kit when they can download free simulation programs from the Internet or acquire cheap educational licenses for commercial applications. Educational kits like the one proposed cannot be downloaded or copied. Each user has to buy one to use it. Therefore, in order to spread and make electronics popular, these systems need to be affordable for individuals, and also for schools.

The Volume of the Kits:

All the known building sets, apart from the uncomfortable breadboards, are very bulky. For that reason it happens very often that kits are used only during a week or two, and then they are put in the junk room. This is specially true in big cities where the flats are small and the students don't have much room. It is an object of the proposed system that the set occupy three times the surface of a scientific calculator or as much as a medium-sized book. This will allow students to build their circuits in their normal classroom desks, making it unnecessary to resort to specially designated classrooms.

3.2. Problems Found in the Most Related Documents of the Prior Art.

Up to this point the problems that all the kits to teach electronics have in common have been analyzed. Hereafter the specific problems of the documents considered most related to the prior art will be analyzed in detail (documents FR 2412128 and WO 98/25253).

3.2.1. The shapes and dimensions of the building blocks, permanent magnets and grid are not interrelated in order to minimize dimensions and cost and maximize the ease of operation.

3.2.2—It is difficult to place with precision the permanent magnets in the desired locations of the base plate. When the permanent magnets are moved over the base plate, the high friction that exists between the plate and the magnet makes it necessary to exert a great pushing force. The bigger the necessary pushing force is, the less precise the placement is and the more corrections to be done. On the other hand, a great friction force results in an intense wear of the base plate and of the permanent magnets. All these problems exist even when a paper sheet is placed between the base plate and the magnets. The contact between paper and magnets creates a great friction. At the same time paper would wear as well. Besides that, the stronger the magnets are, the more intense the wear is and the more difficult it is to place the magnets with precision. However, it is desirable to use powerful magnets, as that guarantees a good fixation of the magnets to the base plate and a good fixation of the building blocks to the magnets. On the contrary, if the magnets are not placed by moving them across the panel, but separating them from the panel and placing them in the desired position, other problems arise. In the first place, the magnets need to be considerably big for the user to be able to lift them. Big magnets need a big base plate and big building blocks. At the same time big magnets are expensive. In the second place, lifting and placing big and powerful magnets is dangerous. It happens very often that, when trying to place a magnet on a ferromagnetic surface, the magnet escapes from the fingers, accelerates and collides violently with that surface. Another problem is that big magnets can interfere with elements sensitive to magnetism, like credit cards, floppy discs, etc. So, it is clear that permanents magnets should have the minimum power that assures a good operation of the kit. The term "base plate (10)" may be used interchangeably with the term "panel (10)" in this application, except when describing FIGS. 31A and 31B, where the term panel has a different meaning. A base plate is equivalent in structure to a panel, as disclosed herein, apart from the exception lust mentioned.

3.2.3. Horizontal forces acting on the contact plates and on the permanent magnets. When the contact plates are made out of steel sheet, as is disclosed in document FR 2412128, an additional problem appears. When the ferromagnetic steel sheet of a contact plate is placed on a permanent magnet, the magnet attracts the sheet not only in the direction perpendicular to the base plate, but also in the direction parallel to the base plate. The final equilibrium position usually leaves the other contact plates out of reach of their respective magnets. In other words, the steel sheets under the influence of its corresponding magnet try to find an equilibrium position which is not the position it would occupy when all the steel sheets of its building block were situated on its corresponding magnets. This effect makes difficult the placing of the blocks, especially when they are small. At the same time, the contact plates of the building blocks attract the magnets in the same horizontal direction, parallel to the base plate. If the friction between the magnets and the base plate is not high, that attraction can cause that the magnets lose their desired position over the plate. When the magnets lose their right position they can cause short-circuits if they connect two contact plates of one building block. Therefore, it is desirable that when a contact plate of a building block is placed on a permanent magnet, the plate find a stable equilibrium position that is the same position in which the plate rests when all the plates of its building block contact its corresponding magnets.

3.2.4. Transmitting forces to the PCB. The document WO98/25253 fixes the ferromagnetic rivets to the PCB. If the magnets are powerful, removing the building block will cause the PCB to undergo a notable deformation, to crack, or simply to break. The copper pads and copper tracks can also suffer, as the copper could separate from the board, from the substrate. This phenomenon is known as "peeling". The more powerful the magnets are, the more intense the loading of the PCB is.

3.2.5. None of the systems discussed (documents FR 2412128 and WO 98/25253) can be manufactured automatically. The electrical and electronic components that these documents use are not SMD (Surface Mounted Devices), and therefore the kits cannot be manufactured with the automatic "pick and place" machines. The document WO 98/25253, although it is simpler to make than the document FR 2412128 is still very complicated to manufacture automatically since its components have leads or pins and the boards need also the steel rivets.

3.3. Disclosure of the Invention

The present system seeks to solve all the aforementioned problems and at the same time it incorporates other improvements that are not inspired by those problems. Briefly stated, the present system is based on the following points.

3.3.1. Solution to the problem of the horizontal forces. In one embodiment the contact plates soldered to the PCB have a shape such that when the block is in the desired position on a magnet, there is a part of the steel sheet that overhangs from the magnet. The overhanging part has a shape and a form determined by Magnetostatics so that in that position the attraction force component parallel to the sheet surface is zero. If at the desired position the overhanging part is too big, the attraction force will drive the sheet to the magnet and on the contrary, if the overhanging part is too small or even zero, the attraction force will displace the sheet away from the magnet.

In other embodiments the aforementioned force component does not disappears but is neutralized by retaining stops fixed to the sheets.

3.3.2. Optimization of the size of the permanent magnets. The optimum size of the magnets depends on the size of the grid of contacts; more precisely it depends on the distance between adjacent nodes of the grid. That distance will be referred to as "grid distance" throughout this document. One limitation of the size of the magnets is that its width cannot be equal or bigger than the grid distance to avoid that two adjacent magnets make contact. For that same reason, linear building blocks, i.e. blocks that only link magnets of one row or column, have a width equal or narrower than the grid distance. The width of the contact plates must be also narrower than the grid distance so that two adjacent contact plates don't make contact between them. The shape of the contact plates is also important. The present contact plates have a convex shape. In the preferred embodiment the shape is pointed, the angle of the point is 90°, and the vertex is in the symmetry plane of the contact plate. The shape and the size of the permanent magnets are conceived in such a way that when four contact plates converge symmetrically on a magnet, with the vertices of the points placed on the centre of the magnet, the contact plates cover the whole horizontal surface of the upper face of the magnet; that way no magnetic material is wasted. Although the following figures show only cylindrical magnets, it is also possible to use magnets shaped as right prisms with regular polygonal bases. If this type of magnets is used with building blocks that have retaining stops, the number of sides of the regular polygon must be multiple of four, so that the face of the retaining stop contacts one face of the prism and not only one edge.

3.3.3. Solution to the problems of placing the magnets and avoiding the wear of the base plate and the circuit diagram. The kit has a transparent, insulating, plastic sheet of low friction coefficient (for example an acetate sheet) placed over the base plate or over the circuit diagram that is over the panel. That way, the magnets slide easily, smoothly, and the wear is at a minimum. At the same time, placing the magnets in their indicated positions is made gently. It suffices to push slightly with a finger to slide a magnet to the desired position on the circuit diagram.

3.3.4. Solution to the disarrangement of the magnets. Although when all the contact plates of a building block rest on their magnets the horizontal forces acting on the block usually neutralize themselves, and although there are blocks that when placed in position feel no horizontal forces at all, it happens very often that placing and removing the blocks on or from their magnets disarrange the magnets. This problem is especially acute when the friction between the magnets and its supporting surface is low. To solve this problem the kit includes a plastic sheet with the same properties to the one previously described but perforated. That plastic sheet has a grid of holes. Each hole has the shape of the silhouette of a magnet and the separation between holes is the same as the separation between nodes of the grid of contacts that is printed on the base plate. This perforated plastic sheet is placed after the magnets have been situated in the indicated nodes of the grid of contacts. Once this sheet is in place the magnets cannot slide horizontally. That way the disarrangement caused by placing and removing the building blocks is avoided and the ease of use is improved. At the same time short circuits and the joining of magnets are prevented (separating two powerful and small magnets that have joined together is rather difficult). The perforated sheet also makes it possible to place and remove the building blocks on or from the magnets in a direction parallel to the base plate plane, i.e. in a direction parallel to the plane of the upper face of the magnets.

3.3.5. Solution to the problem of transmitting forces to the PCB. As it has been just mentioned, the perforated plastic sheet makes it possible to remove the building blocks pulling in the direction parallel to the base plate. That is not possible with the known systems because the magnets would slide and lose their position. Furthermore, the necessary force to remove the building blocks from the magnets in this direction is much smaller than the force that needs to be exerted to remove the blocks pulling in the direction perpendicular to the base plate, perpendicular to the upper faces of the magnets.

Soldering ferromagnetic steel sheets to a PCB is something unknown in the art. The reason is that PCB's are made to develop an electrical function, but not a mechanical function. The copper pads and the copper traces of the PCB's are not designed to withstand tensions, since it could possibly provoke the peeling of the PCB. In brief, the perforated plastic sheet brings the following advantages:

- The tension of the tin solder between the ferromagnetic steel sheet and its copper pad is reduced. Furthermore, the direction of the force that the solder withstands is exerted in the direction parallel to the copper pad and not in the perpendicular direction.
- The tension of the union between the substrate of the board and the copper pad is reduced. Furthermore, the force that the union withstands is parallel to the surface of the copper pad and not perpendicular. That way the peeling of the PCB is prevented.
- Due to the previous advantages the ferromagnetic elements can be simply soldered to its copper pad of the PCB. It is important to highlight that the ferromagnetic elements of the document WO 98/25253 are rivets that go through the PCB. However, fixing the ferromagnetic elements to the PCB exclusively by soldering to the copper pad would be dangerous without the perforated plastic sheet. In that case removing the components by pulling in the perpendicular direction to the PCB would put the solders and the unions of the PCB under heavy mechanical loads.
- Due to the previous advantages it is possible to use contact plates that overhang, that protrude (like a cantilever), from the PCB. This solution would be unthinkable if the building blocks were removed by pulling in the perpendicular direction. In that case, the ferromagnetic element would be a cantilever with a lever arm that would give rise to high tensions in the solders and unions (copper-substrate) that would damage the PCB.
- Due to the previous advantages and also due to the fact that the present contact plates and electronic components are smaller, it is possible to use thinner PCB's than with the known systems. It is possible to use PCB's of 0.8 mm thick instead of the more common 1.6 mm thick PCB's. Thin PCB's are more economical and easier to route, to mechanize.

4. BRIEF DESCRIPTION OF THE DRAWINGS

FIGS. 10 to 19 show different situations to explain how horizontal forces can disarrange the building blocks and the magnets.

FIGS. 21 A-D and 22 A-B show the preferred embodiment of the building blocks.

FIGS. 23, 24 and 25 show three different embodiments based on the preferred embodiment.

FIGS. 26 A-D show an embodiment of the building blocks in which the steel sheets overhang from the PCB.

FIGS. 27 A-C show an embodiment similar to that of FIG. 26 but that mount lead components instead of SMD components.

FIGS. 28 A-B, 29 A-E show different embodiments of the jumpers.

FIGS. 30 A-D show different embodiments in which the disarranging forces are neutralized by the edge of the PCB.

FIGS. 31 A-B show a PCB in which an assortment of building blocks have been manufactured. These blocks are linked to the board by thin nerves that can be broken with the hand.

FIGS. 32 A-C show three embodiments of the overhanging steel sheets. In those embodiments the sheets exhibit a weakening to facilitate its flexion.

5. DESCRIPTION OF AT LEAST ONE WAY OF CARRYING OUT THE INVENTION

Figure 1:
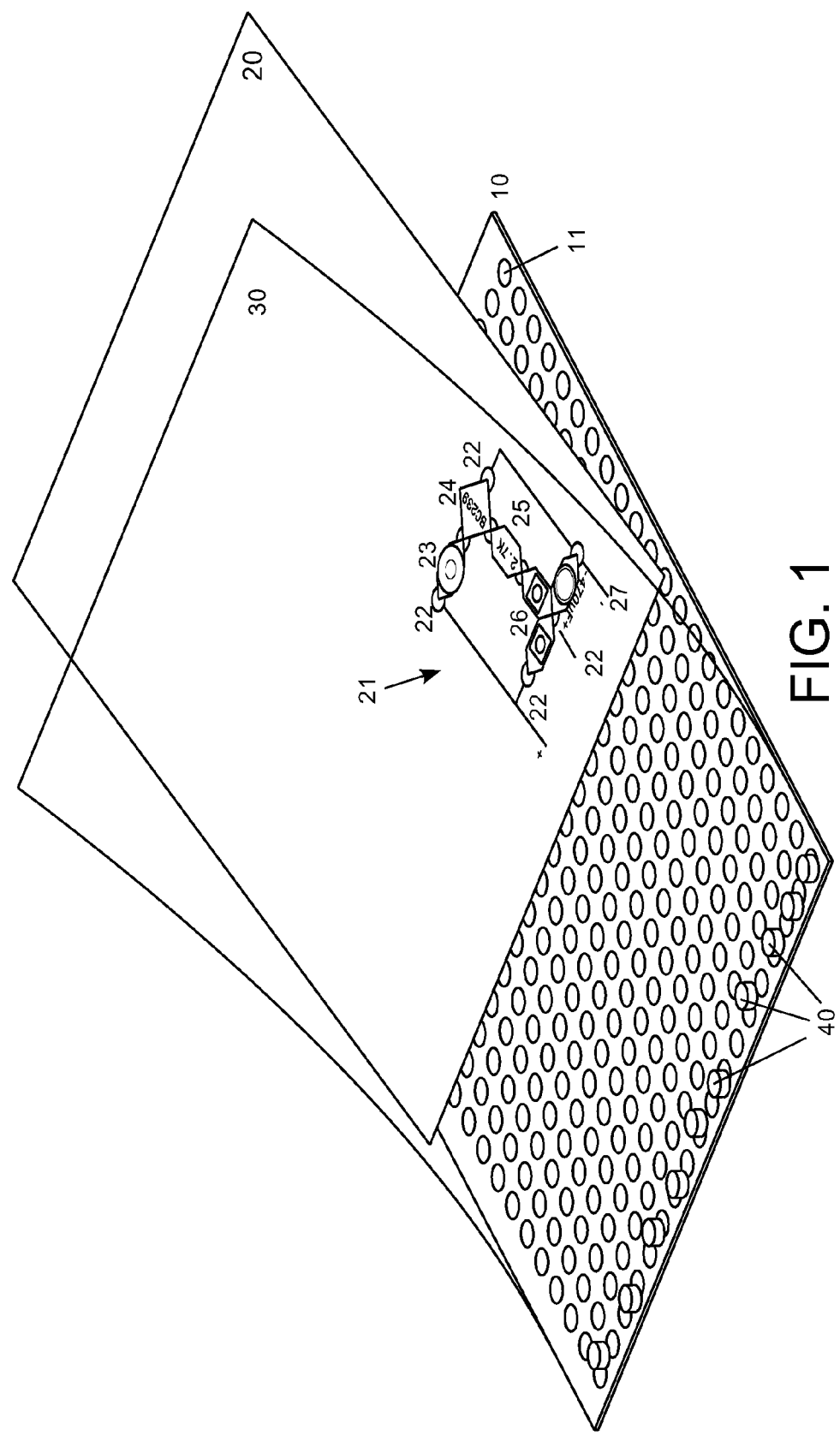
FIG. 1 shows the first step to build a circuit: to place the circuit diagram.

FIG. 1 shows the first step to build one circuit with building blocks. More precisely, FIG. 1 shows the base plate 10 that supports the whole set. Usually the base plate 10 rests in a horizontal position. The base plate 10 is made of a ferromagnetic material. In a preferred embodiment this ferromagnetic base plate 10 is coated with painting on both sides and on the upper face shows a square grid 11 that in every node or point of the grid has the silhouette of a magnet 40. The grid 11 of FIG. 1 is a grid of circles because the magnets are cylindrical, but other shapes are possible. This grid of circles represents the grid of places where it is possible to establish contacts, because as it has been mentioned before the present system is topologically a grid of contacts. Nevertheless, the grid of circles 11 printed on the panel is only used to build a circuit directly on the base plate, without a paper containing the circuit diagram. On the contrary, when the user wishes to build a circuit following a circuit diagram, then a sheet of paper 20 with the diagram is placed on the base plate 10. This sheet of paper 20 contains the circuit diagram 21. On the space of the paper sheet that the diagram leaves free is printed the explanation of the operation of the circuit and other educational instructions.

On the circuit diagram 21 the symbols 22 indicate where the magnets 40 must be placed. The symbol 23 represents a light bulb, the symbol 24 represents a bipolar transistor BC239, the symbol 25 represents a 2.7 KΩ resistor, the symbol 27 represents a 470 microfarads electrolytic capacitor, and symbols 26 represent push buttons.

FIG. 1 also shows how over the paper sheet 20 a transparent plastic sheet 30 is placed. This plastic sheet 30 is fixed to the ferromagnetic base plate 10 due to the pressure that magnets 40 exert over the sheet 30 against the panel 10. The sheet 30 has the same shape as the base plate 10. While the magnets 40 are not part of a circuit they are placed on one side of the base plate. The magnets are not stacked, but placed freely over the transparent plastic sheet 30, on one side of it. That way the transparent plastic sheet 30 remains fixed to the panel 10 but can be raised by one side, by the side opposite to where the magnets 40 are stored. The plastic sheet 30 is raised to introduce the paper sheet 20 between the base plate 10 and the plastic sheet 30.

The paper sheet 20 is slightly narrower than the base plate 10 and the plastic sheet 30. When the magnets 40 are not part of a circuit they are placed on the plastic sheet 30 over the zone of the base plate 10 that is not covered by the paper sheet 20.

The magnets 40 should preferably be of a cylindrical shape, although other shapes are possible. For example they can have a right prism shape with its base being a square, or any other regular polygon with the number of sides in a multiple of four. The magnets 40 have preferably an axial polarization and are placed with the same pole facing downwards. In other words, all the magnets 40 have the south pole (or the north pole) in contact with the transparent plastic sheet 30. That way when two magnets are close to each other they will repel, which is favourable because separating two small magnets is always rather difficult.

Figure 2:
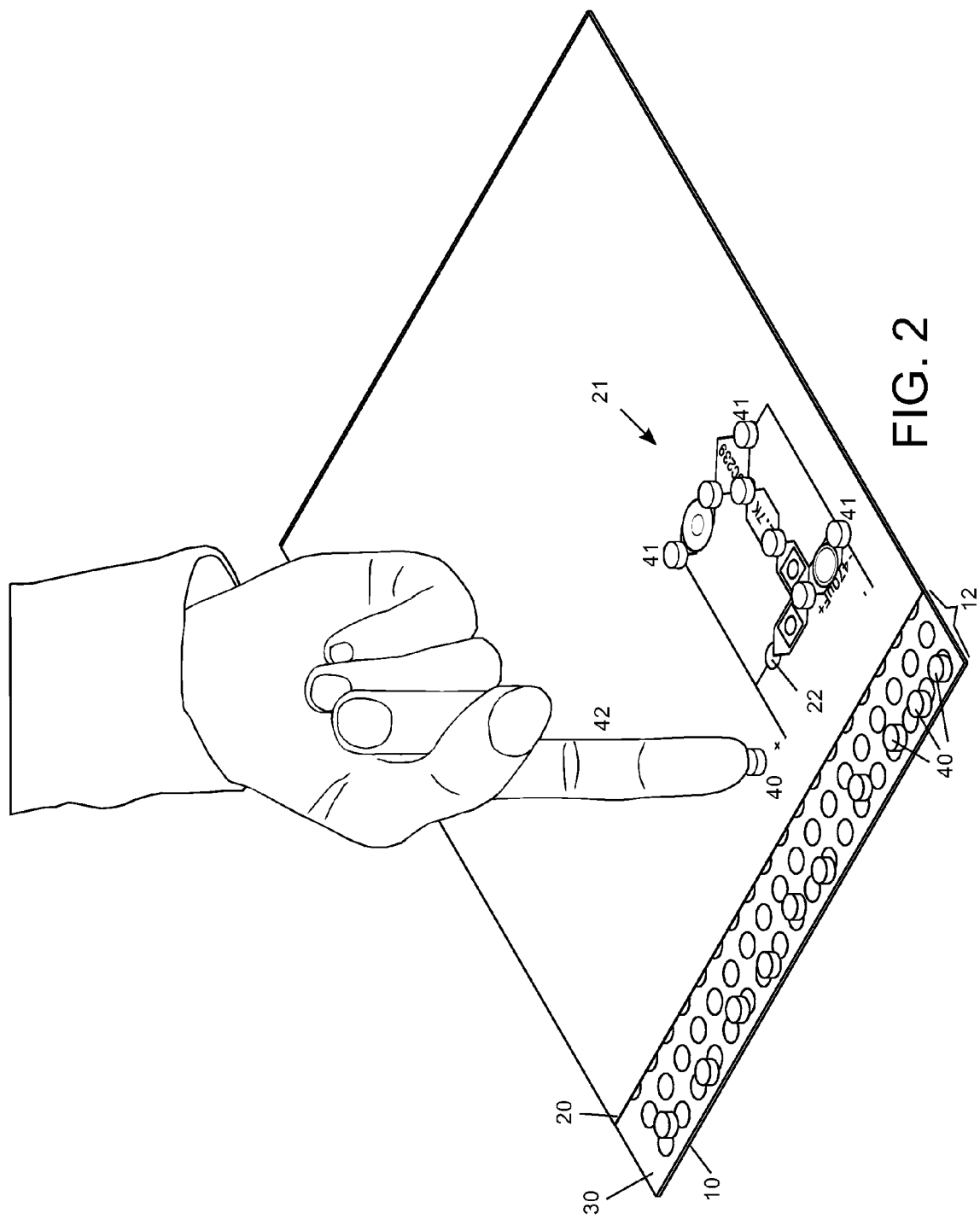
FIG. 2 shows the second step: to place the permanent magnets in the indicated nodes.

FIG. 2 shows the paper sheet 20 in position over the base plate 10. Over the paper sheet 20 the plastic sheet 30 is also placed in position. Since the paper sheet 20 is narrower than the plate 10 and plastic sheet 30, a strip 12 of the grid of contacts 11 is visible. Over this strip 12, on the plastic sheet 30, the magnets 40 are stored while not in use.

As FIG. 2 shows, the base plate 10 is just slightly bigger than a hand. That is the approximate size that permits to make a game, a kit, of small dimensions, similar to the size of a book. The applicant has found that the optimum distance between adjacent nodes of the grid of contacts is 7.62 mm. One criterion to choose the distance between contacts is that such a distance be a multiple of 2.54 mm (0.1 inch), since that is the typical separation between pins of electronic components. 7.62 mm is the triple of 2.54 mm. Using that value, the resulting base plate with an outline similar to a medium size book has a number of nodes that is enough to build circuits of high complexity. Furthermore, 7.62 mm is the value that permits two cylindrical neodymium magnets of quality N52, and 5 mm diameter and 2 mm height, standing on a plastic sheet attracted by a ferromagnetic base plate on the opposite side, remain in their positions without separating. If the magnets stand separated by a distance lesser than 7.62 mm, the repulsion force would increase that distance. For that reason, the separation of 7.62 mm is not arbitrarily chosen but is the minimum value that fulfils all the desired requirements:

that the grid of contacts, limited to an approximated size of 210×210 mm, have more than 20 rows and 20 columns that the magnets be easy to handle. A distance of 7.62 mm permits the use of cylindrical magnets with a diameter of 5 mm. That is a standard size and at the same time is a size that permits the placement of the magnets very easily by pushing them with a finger that two magnets placed on a plastic sheet at that distance do not separate or join.

FIG. 2 shows a hand with a finger 42 that pushes a permanent magnet 40 over the transparent plastic 30 to place it on the position 22 indicated on the circuit diagram 21. The magnets that rest on the positions indicated by the circuit diagram are marked with the numerical reference 41. The transparent plastic sheet 30 has different functions: it protects the paper sheet 20 and the base plate 10; it also protects the magnets. The friction between the magnets and the plastic sheet is very low, which makes the magnets 40 slide smoothly when pushed softly with a finger. On the other hand the plastic sheet 30 is a good electrical insulator and doesn't absorb humidity. In humid climates the paper sheet 20 can absorb humidity from the environment increasing that way its electrical conductivity. If a plastic sheet 30 is not placed on the paper, the humidity from the environment can alter the operation of the circuit.

Figure 3:
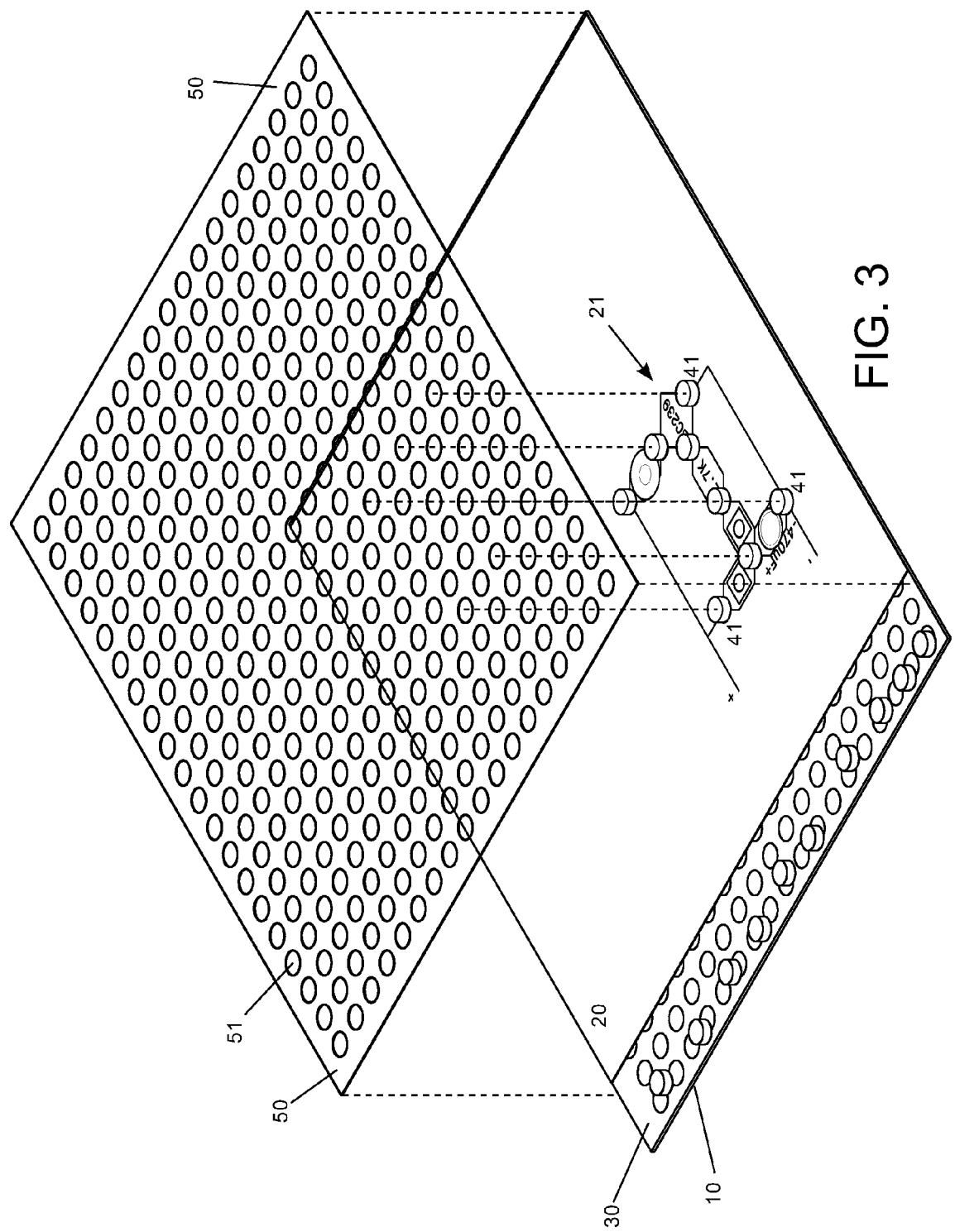
FIG. 3 shows the third step: to place the perforated plastic sheet on the base plate to prevent the disarrangement of the magnets.

FIG. 3 shows how after all the magnets are in their correct positions the transparent perforated plastic sheet 50 is placed on the plastic sheet 30. The perforated plastic sheet 50 has a grid of holes 51, the diameter of the holes being equal to the diameter of the magnets 40 and 41. When the perforated sheet 50 is placed on the plastic sheet 30, the magnets 41 that are situated on the indicated positions 22 of the circuit diagram 21 go through the perforated sheet 50 by way of the grid of holes 51. The holes 51 have the same silhouette as the magnets and are arranged in a grid equal to the grid of contacts. The plastic sheet 50 is narrower than the base plate 10 and plastic sheet 30, in such a manner that the magnets storage area 12 is not covered. For that reason the magnets 40 in the area 12 need not be arranged in order.

The function of the perforated sheet 50 is to prevent the magnets 41 from disarranging, from losing their indicated positions 22 on the circuit diagram. Without this sheet 50, the magnets 41 would easily lose their positions sliding over the sheet 30. The transparent perforated sheet 50 is not fixed by pressure, but maintains its position because of the holes 51 and the magnets 41. If a magnet 41 tries to move, the sheet 50 blocks its way because the rest of the magnets 41 keep their positions and retain the sheet 50. The perforated sheet 50 is free in the direction perpendicular to the base plate.

Figure 4:
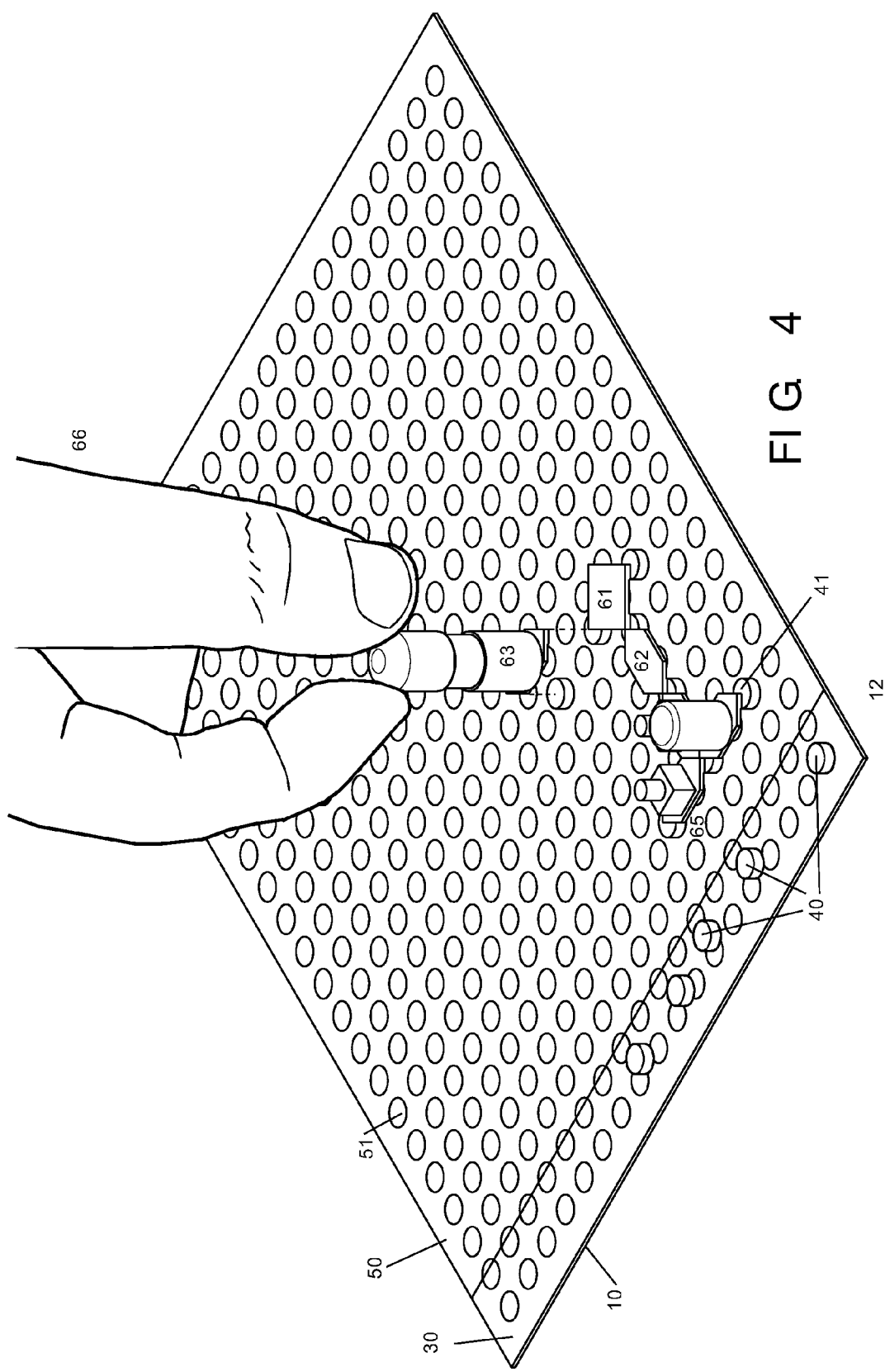
FIG. 4 shows the fourth step: to place the components on the magnets.

FIG. 4 shows the base plate 10. In this figure the paper sheet 20 has been omitted to make the drawing more clear. On the top of the panel 10 is drawn the transparent plastic sheet 30 and on top of it the magnets 41 situated in the correct position and the stored magnets 40 in the storage area 12. The transparent perforated sheet 50 is also found in its place, i.e. in contact with the sheet 30. FIG. 4 also shows some building blocks placed in position. For example, two push buttons 65, a resistor 62 and a transistor 61 are in contact with their magnets 41 while a hand 66 is placing the light bulb building block 63 in its indicated position. The building blocks represented in this figure are one of the embodiments, but other embodiments are possible. Once the light bulb block 63 is in position only the power supply would be missing. The power supply has been omitted for clarity. The operation of the circuit of FIG. 4 would be as follows. By pressing the push button 65 that is aligned with the capacitor 64, the capacitor charges. Releasing the aforementioned push button and pressing the push button aligned with the resistor 62 the capacitor 64 discharges through the base of the transistor 61, creating a current between the collector and the emitter that makes the bulb 63 light. At the beginning, the bulb shines intensely, but quickly it begins to dim and finally the glow disappears when the capacitor is depleted.

Figure 5:
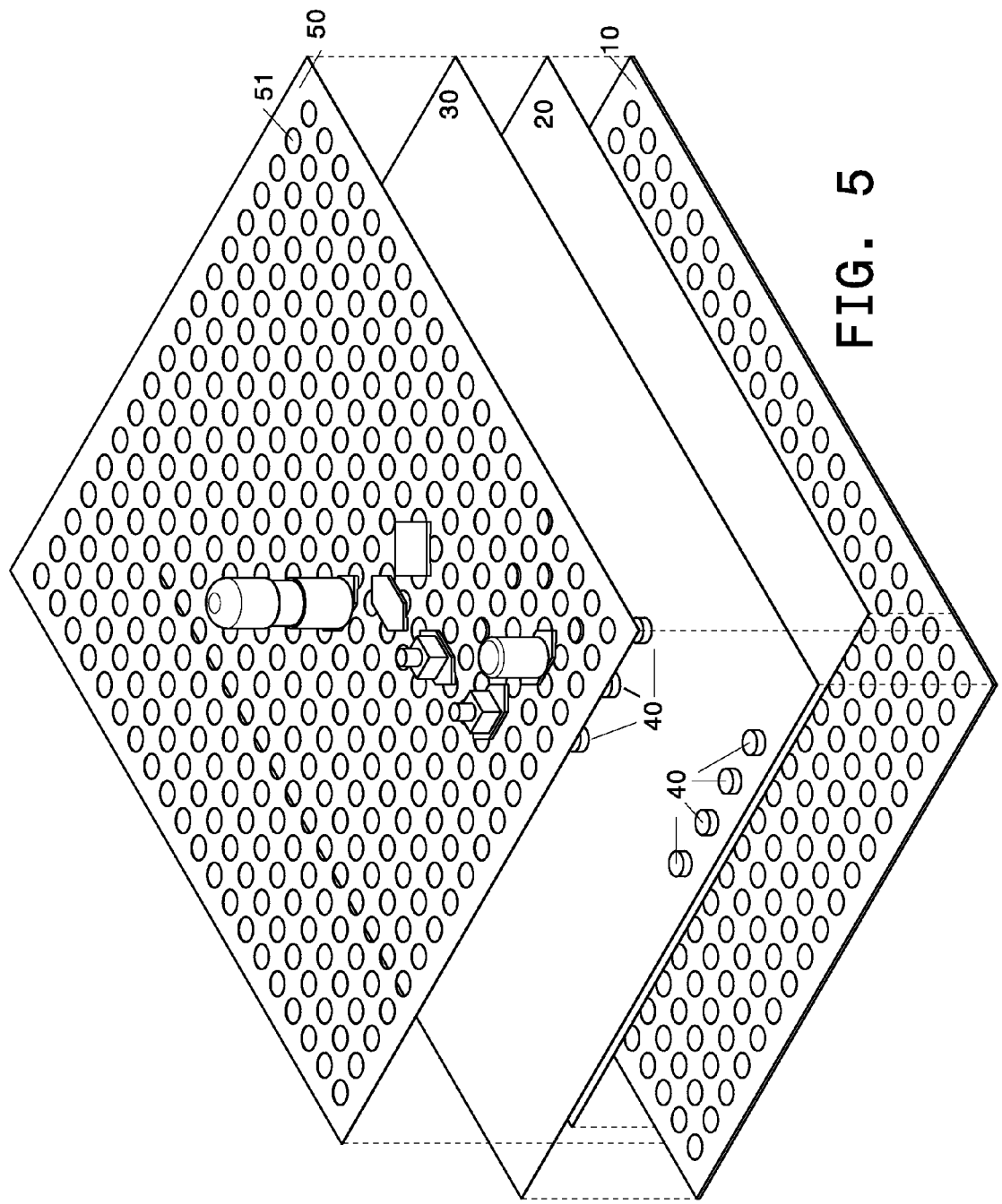
FIG. 5 is an exploded view of the assembly.

FIG. 5 is an exploded view. The circuit diagram 21 has been omitted from the paper sheet 20 to improve the clarity of the drawing.

Figure 6:
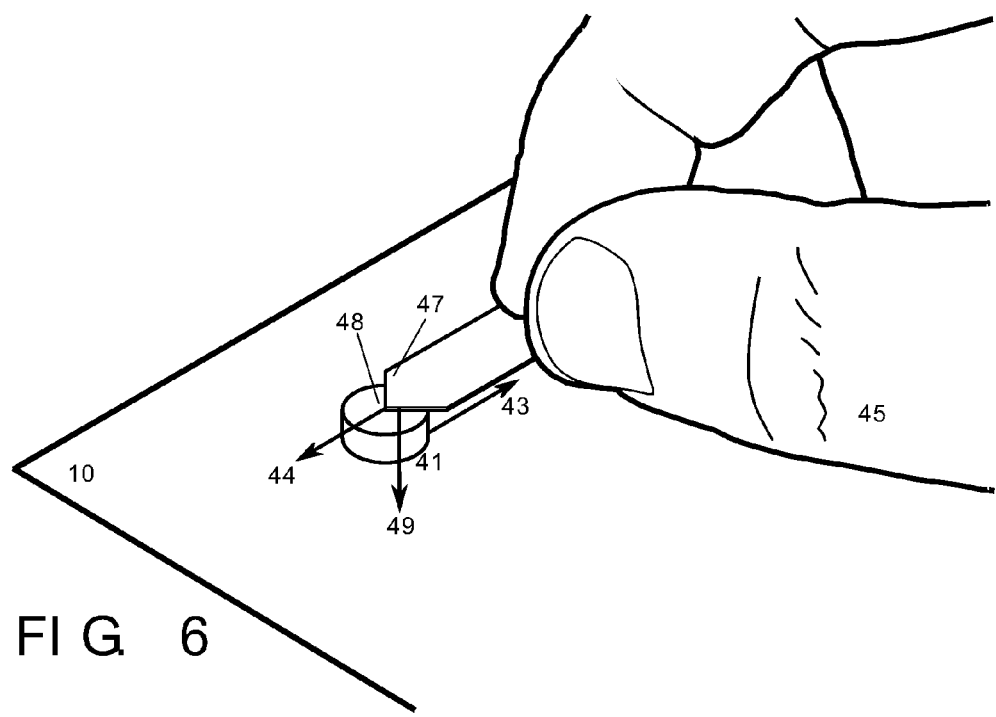
FIG. 6 shows the forces that appear on the steel sheets and on the permanent magnets when the sheets are in the correct position but overhang from the magnets.

FIG. 6 shows one of the problems of the systems known in the art. FIG. 6 shows a very simple building block, more precisely, a jumper 47 to connect two magnets. The building block is just a ferromagnetic steel plate 47. Such a simple element has been chosen in order to simplify the explanation. However, this problem posed is present in many other building blocks that are not well designed. More precisely, this problem appears whenever the ferromagnetic steel plate overhangs too much from the magnet when the building block is in the right position and whenever the steel plate has no retaining means to neutralize the horizontal disarranging force. The figure shows a horizontal ferromagnetic base plate 10 on top of which a magnet 41 rests in a correct position (a paper sheet 20 and a plastic sheet 30 could also be present). A hand 45 holds the ferromagnetic sheet 47 making surface contact with the upper face of the magnet 41 in the correct position with respect to the magnet: the tip of the steel sheet in the centre of the upper face of the magnet. In that position, and while the hand 45 holds the jumper 47, two forces arise on the steel sheet 47: the horizontal force 44 and the vertical force 49. Force 49 is desirable and convenient, and is responsible for good electrical and mechanical contact between the plate 47 and the conductive surface of the magnet 41. On the contrary, horizontal forces 44 and 43 are undesirable. Force 44 appears because the part that overhangs is too big, above the size that cancels horizontal forces 43 and 44. In other words, the equilibrium position of the steel plate 47 when it rests on the magnet is not the desired position. At the same time, the magnet 41 feels a force 43 of the same magnitude but in opposite direction to the force 44. Forces 43 cause that the magnets 41 lose their indicated positions on the sheet 30 and that the building blocks lose the desired positions when they rest on a magnet 41. When a building block like the steel plate 47 rests on two magnets placed at the correct distance, both tips being on the centres of the upper faces of the magnets, then a force appears on each side of the plate 47. These forces neutralize each other. Although when a building block rests on two magnets the forces neutralize each other, it is very desirable that these forces don't even appear when the block rests on a single magnet. That way, short circuits are prevented and placing and removing the components is also easier.

Figure 7:
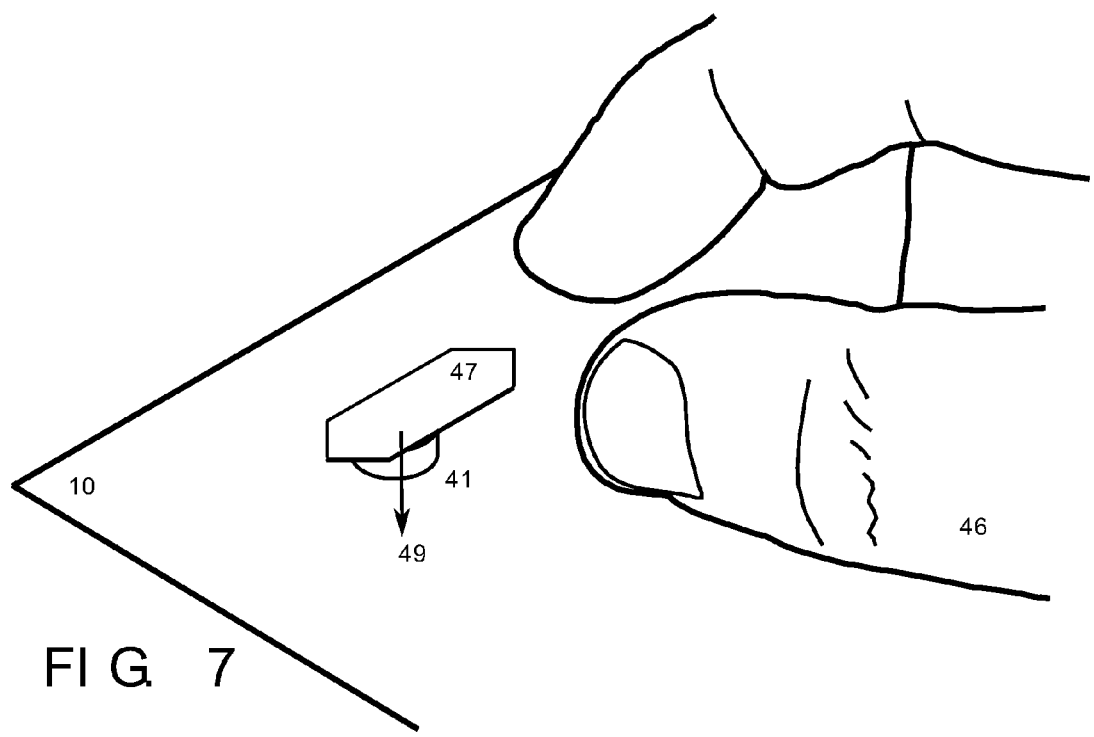
FIG. 7 shows how a steel sheet that is not well designed seeks an equilibrium position that is not the correct position over the magnet.

FIG. 7 shows the steel plate 47 of FIG. 6 resting in the equilibrium position, which is not the desired position. In the equilibrium position the horizontal forces 43 and 44 have disappeared or are so small that they cannot overcome the static friction force between the steel sheet and the magnet. The only force that continues to exist is the vertical force 49 that attracts the plate against the horizontal surface of the magnet. That is the desirable force.

Figure 8:
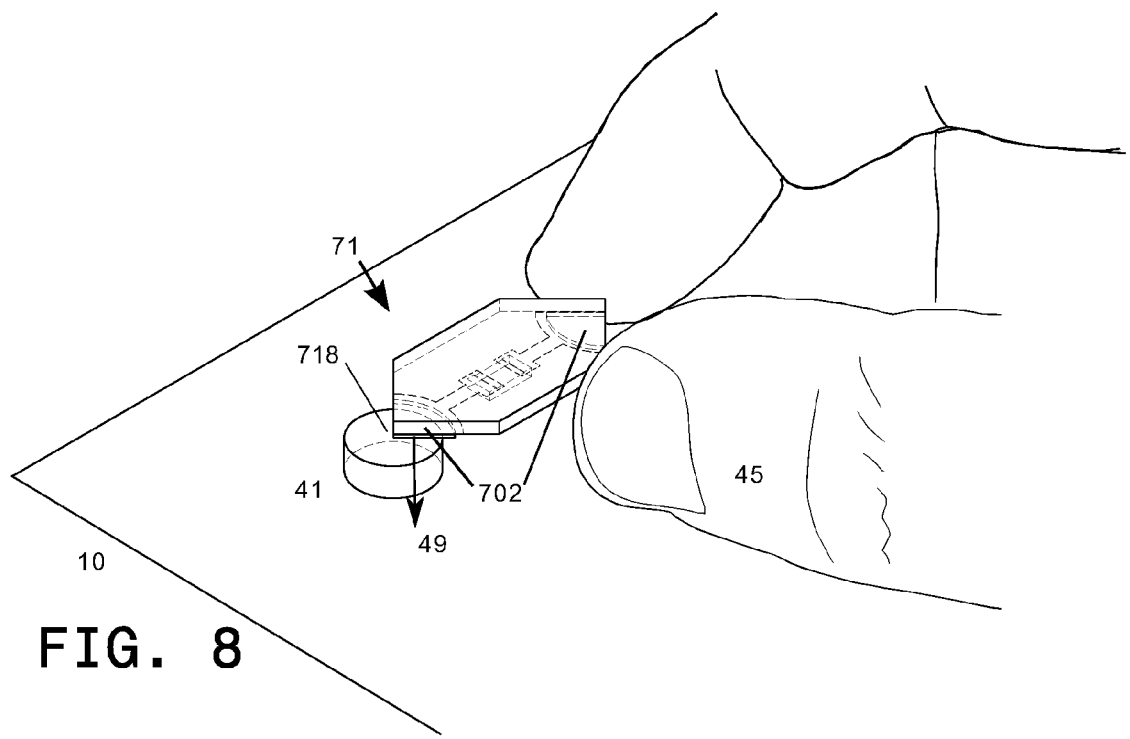
FIG. 8 shows a well designed building block in the correct position over a magnet. The figure shows that in that case there appear no parallel forces to the base plate.

FIG. 8 shows an embodiment that solves the problem of FIG. 6 and FIG. 7. FIG. 8 shows a hand 45 that has just placed the building block 71 on the magnet 41 in the desired position, i.e. with the contact plate 702 of the building block touching the upper face of the magnet 41 and the tip 718 of the building block 71 on the centre of the upper face of the magnet. In that position, no horizontal force appears, no force parallel to the base plate 10 appears. The only force that the magnet 41 exerts on the building block 71 is the attraction force perpendicular to the base plate 10, perpendicular to the upper face of the magnet and perpendicular to the building block 71. That is the force 49 that is a desirable force.

Figure 9:
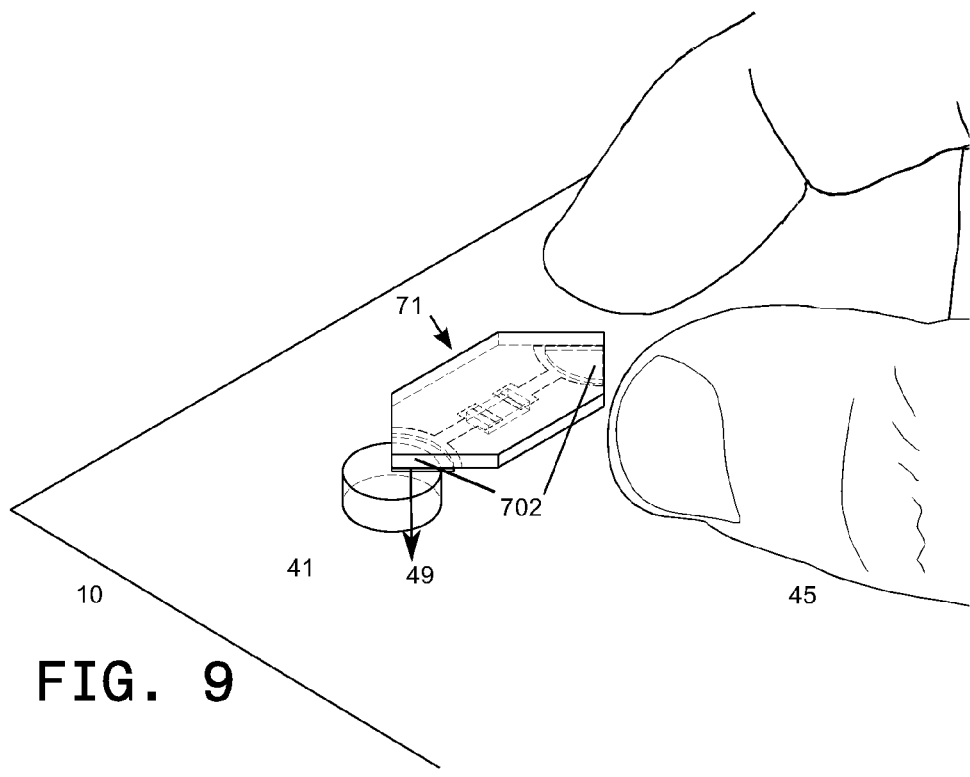
FIG. 9 shows how the building block of FIG. 8 remains in its position even when it is let go.

FIG. 9 shows how the building block 71 remains in the desired position even when the hand 45 retires. The reason for that is that the ferromagnetic steel sheet 702 of the building block 71 is well designed. When the building block is in the right position with respect to the magnet, there is a part of the contact plate 702 that overhangs. This overhanging part has a shape and size such that the horizontal component of the force is zero. This detail will be explained in more detail ahead.

FIG. 10 illustrates schematically the problem of the disarranging forces that appear on the known systems. For example, when the steel sheets overhang too much from the magnet, as it happens in the system of document FR 2412128, disarranging horizontal forces 43 and 44 appear.

FIG. 11 shows the disarranging forces that exhibit another embodiment of the present system. In that embodiment the building block 81 is formed with a PCB 810 which has two steel sheets contact plates 801. Those contact plates 801 are pointed, as are the plates 702, but overhang in excess from the magnet when the building block is in the desired position. In order to simplify, the building block 81 has been represented without any electronic component and without the retainers that neutralize the disarranging forces.

FIG. 12 shows a part of FIG. 11, but in an even more outlined manner. Only the steel sheet 801 and the magnet 41 appear. That way it is possible to consider that the contact plate 801 consists of two zones: zone A and zone B. Zone A is the part that contacts with the magnet when the building block is in the desired position. Zone B is the part that overhangs, the zone that protrudes from the magnet. As zone B is too big, the disarranging forces 44 and 43 appear. Force 43 has the same magnitude and direction of force 44 but its sense is opposite. Force 43 is the force that the steel sheet 801 exerts on the magnet in the horizontal direction.

FIG. 13A shows in a simplified way a building block 71 of the preferred embodiment resting on a magnet 41. The drawing is ground view of the set shown in FIG. 9. It is clear how sheet 702 overhangs from the magnet 41 the exact quantity that cancels the horizontal force in the desired position. The exact quantity and shape of the overhanging part is a function of several variables: the thickness of the sheet, the material of the sheet and magnet, the friction of the surfaces, etc. The solution to this function is not unique, a plurality of optimal solution exist. FIG. 13A shows a solution in which the sheet is a circular sector. There are in the market a great number of commercial programs, that make it possible to know the attraction force between two or more elements. One of the most known programs is Maxwell®, that belongs to the company Ansys®. A person having ordinary skill in the art would surely know how to determine shapes and sizes of the sheet to solve the problem. The radius of the circular sector shown in FIG. 13A depends on the aforementioned parameters. However, during the trials conducted it has been proved that the size of the sector compared with the magnet is approximately as FIG. 13A shows.

FIGS. 13B and 13C show other embodiments in which the overhanging part of the sheet 702 have a different shape to solve the problem of cancelling the horizontal forces.

FIGS. 14A, 14B and 14C are a still more simplified representation of FIG. 9. Here only the sheet 702 and the magnet 41 are shown. With this simplification it is completely clear that the sheet 702 overhangs just the right quantity from the magnet to cancel the horizontal force. If a sheet is in the desired position but overhangs too much, a force will appear that will drive the sheet and its module towards the magnet. On the contrary, if the sheet does not overhang at all from the magnet, or overhangs less than the optimum, a force will appear that will displace the sheet away from the magnet.

FIGS. 15 to 19 illustrate another problem that the present system identifies and solves.

FIG. 15 shows in an outlined manner a detail of a non-optimized group of building blocks on a magnet. More precisely it illustrates a group of the document FR 2412128 A1. The figure shows a magnet 41 on which four contact plates of four different building blocks converge. These steel sheets feel a disarranging force 44 (only one vector has been drawn for simplicity) but besides that, the steel sheets do not have an optimum size with respect to the magnet 41. The known systems have magnets that are too big and that waste magnetic material. This fact brings the problem stated in paragraphs 3.2.1, 3.2.2, 3.2.4 y 3.3.2.

FIG. 16 shows in an outlined manner a magnet 41 that is not optimized, that is too big compared to the four ferromagnetic steel sheets 702 that converge on it. Although the contact plates 702 don't feel any disarranging force, the magnet is not optimized, occupies too much space and wastes magnetic material.

FIG. 17 shows another non-optimized group. The contact plates are pointed but the magnet is too big and besides that the steel sheets feel a disarranging force 44 (only one vector has been drawn for simplicity).

FIG. 18 shows four contact plates 702 of the preferred embodiment. In FIG. 18, as it happens in FIG. 14, the PCB's have been omitted to improve clarity. This figure clearly shows how four optimized building blocks converging on a magnet 41 cover the whole surface of the magnet with the contact plates 702. This is achieved by the shape of the plates, which are circular sectors having an opening of 90°, and overhanging the exact quantity to cancel the disarranging forces in the desired position. The shown embodiment maximizes the vertical attraction force and minimizes the size of the magnets.

FIG. 19 shows an embodiment that optimizes the size of the magnets but does not solve the problem of the horizontal forces. It is the embodiment shown in FIG. 11.

Although a specific embodiment has been explained that solves the problem of the disarranging forces and optimizes the size of the magnets, other shapes of the contact plates are possible. Next, an example shows how other contact plates can be designed to solve the two problems stated before.

Figure 20A:
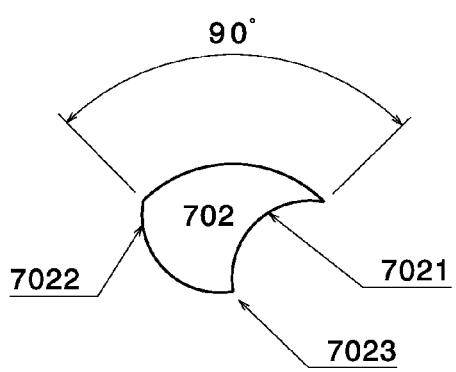
FIGS. 20A to 20F illustrate the procedure to design contact plates that don't create disarranging forces and that optimize the size of the magnets.
Figure 20D:
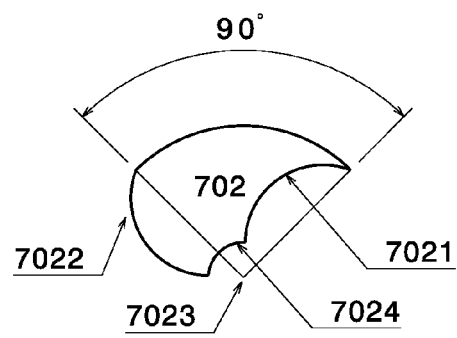
Figure 20B:
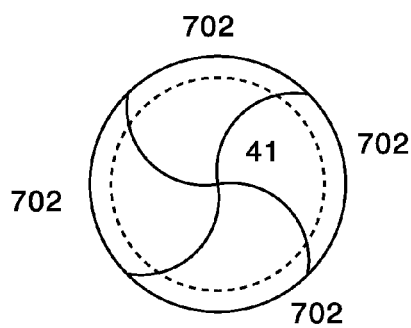

FIGS. 20A and 20B show another kind of optimized ferromagnetic plate 702. The shape of the contact plate of FIG. 20A has been generated from a side 7021. This side can be straight, curved, mixed, etc. FIG. 20A shows a curved side. The side 7021 is rotated 90° around point 7023. This point is one of the end points of the side 7021. The result of the rotation is the new side 7022. The third side of the contact plate is the circular arc 7023 that has a central angle of 90°. This arc is generated by the end point of side 7021 that is not the rotation centre 7023.

As FIG. 20B shows, when the centres of rotation 7023 of four of the abovementioned plates 702 coincide in one point and these contact plates 702 are arranged side by side, each side of one plate contacts the side of the following plate leaving no clearance between them. That way, when four of these contact plates 702 converge on a magnet 41, the radius of the magnet being smaller than the radius of the group of sheets in an exact quantity, then a desired quantity of sheet overhangs from the magnets, and all the horizontal forces cancel. The whole surface of the magnet is in contact with ferromagnetic material and the size of the magnet is optimized, since it is possible to get the same vertical attraction force with less magnetic material.

Figure 20E:
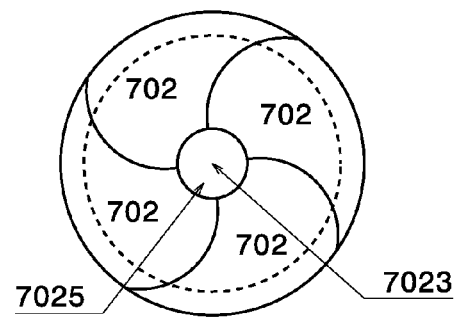
Figure 20C:
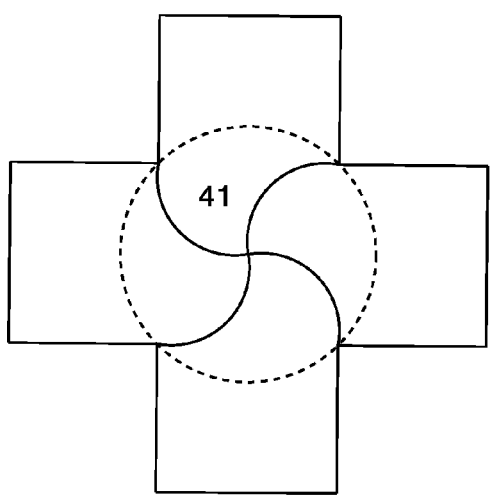

FIG. 20C shows another embodiment of the contact plates. In this embodiment the size of the magnet is optimized, but disarranging forces appear and should be neutralized. The circle drawn in phantom lines represents the magnet 41 situated underneath the plates.

FIG. 20D shows another embodiment of the plates 702. In this embodiment the rotation centre 7023 is a point external to the side 7021. Rotating the side 7021 now creates an internal arc 7024 generated by the point of the side 7021 that is closest to the rotation centre 7023. FIG. 20E shows how when four of these plates converge in a magnet, there appears a central circular opening. Although this opening wastes some magnetic material, it makes possible the introduction of a point of a voltmeter through the opening and measure the voltage in the surface of the magnet 41. It is also possible to create an opening by cutting the tips of the points of the plates of FIG. 20A or of the plates of the preferred embodiment. In that case the opening would not be circular but would perform equally.

Figure 20F:
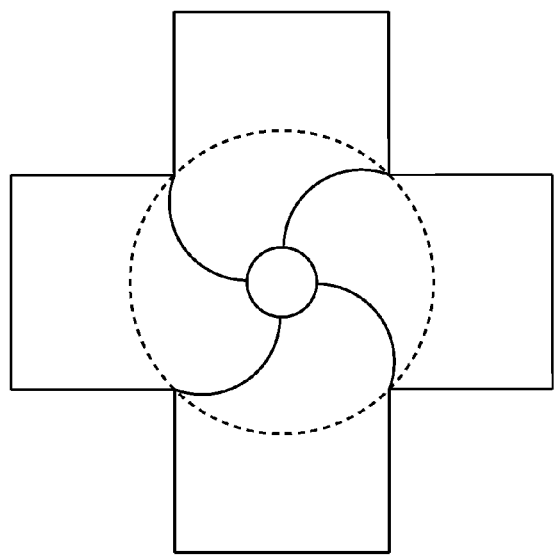

FIG. 20F shows another embodiment, similar to that of the FIGS. 20D and 20E, but that doesn't eliminate the disarranging forces.

Figure 21A:
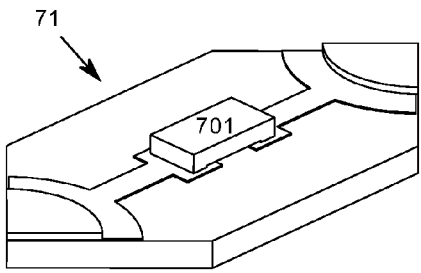

FIG. 21A shows one building block of the preferred embodiment of the invention.

Figure 21B:
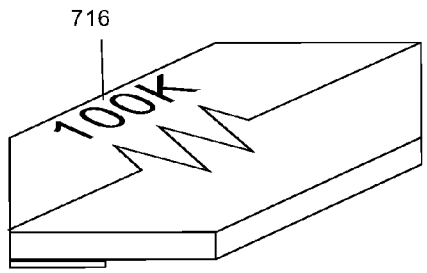
Figure 21C:
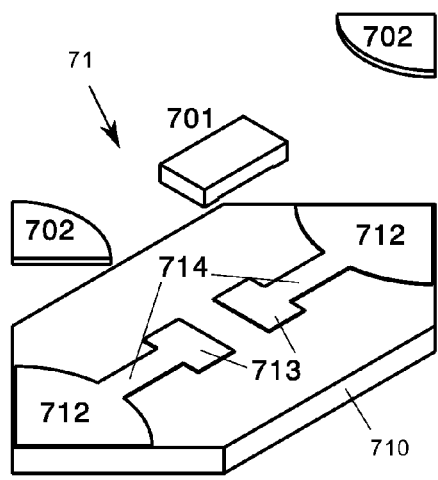

FIG. 21C shows the building block of FIG. 21A, but in a exploded view. The building block 71 comprises a base 710 that is a single-sided PCB. The shape of the base 710 is elongated and pointed. The angle of the points is 90°; that way, when four of these blocks converge on a magnet 41, the whole magnet is covered. The side of the PCB 710 with the copper tracks and pads comprises the following zones: copper pads 712 to solder the ferromagnetic steel sheets 702 and copper pads 713 to solder the SMD electronic component 701. The building blocks of the kit preferably mount SMD components so that it is possible to manufacture the blocks automatically with machines of the type called "pick and place". Copper pads 712 are connected to the copper pads 713 by copper tracks 714.

Although neither FIG. 21A nor FIG. 21C show the solder to simplify, tin solder is the filler material that makes the joints between the PCB 710 and the plates 702 and between the PCB and the electronic component 701.

FIG. 21B shows the other face of the block of FIG. 21A. This face has no copper layer, and the silkscreen (the symbol of the electronic component ant its value 716) is printed on it.

Figure 21D:
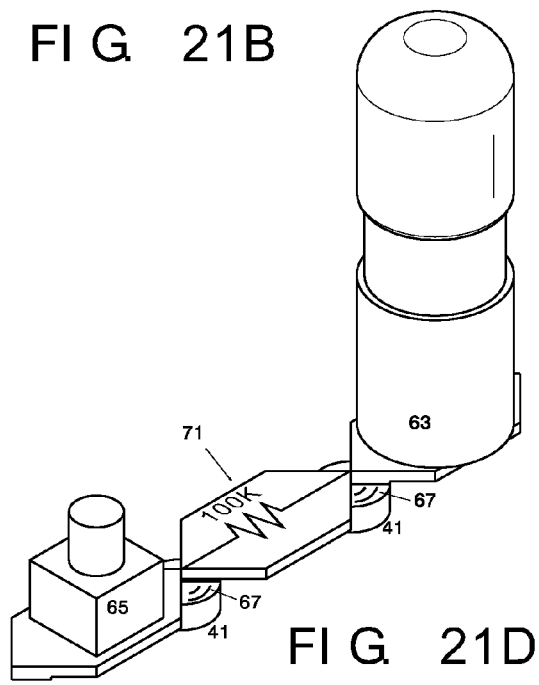

FIG. 21D shows the block 71 placed in position over two magnets 41. FIG. 21D also shows a push button 65 and a light bulb 63. The figure seeks to illustrate how the electrical current circulates through the surface of the magnet 41. Some current lines 67 have been drawn.

Figure 22A:
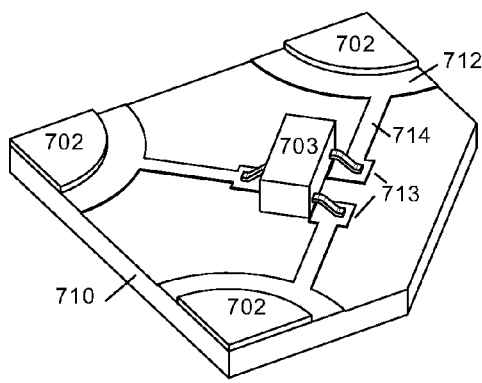

FIG. 22A shows a building block of the preferred embodiment that mounts an electronic component with three contacts instead of two. It could be, for example an SMD bipolar transistor, more precisely a MMBT2222A transistor of SOT-23 encapsulation manufactured by Fairchild Semiconductor®.

Figure 22B:
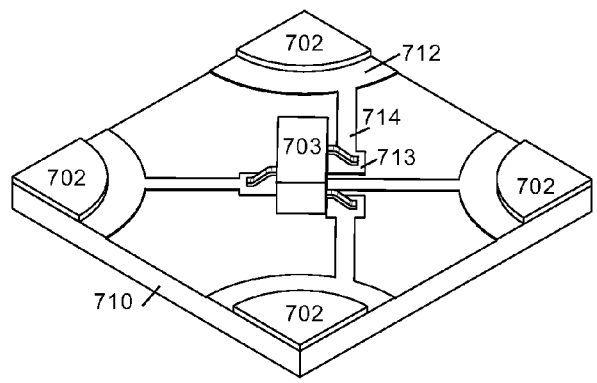

FIG. 22B shows a transistor block similar to the one of FIG. 22A. This block has two contact plates 702 arranged on opposite vertices of the square. This block has the advantage that the base is accessible from any of the semi-planes in which the line collector-emitter divides the plane.

Figure 23A:
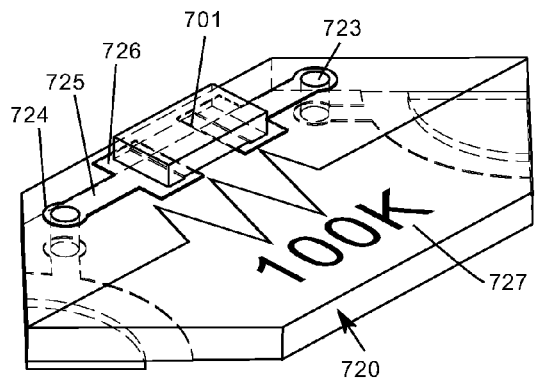
Figure 23B:
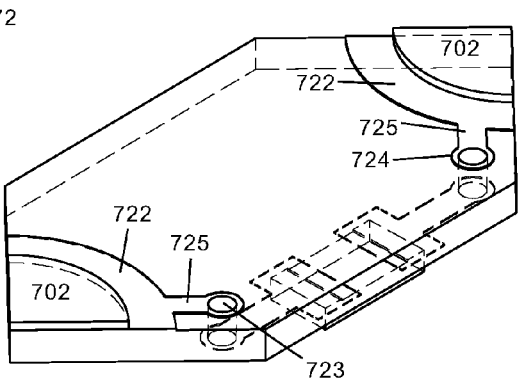

FIG. 23A and FIG. 23B show another possible realization of the building blocks. The figures show a building block 72 based on a double-sided PCB 720. The electronic component 701 is soldered to the opposite side of the ferromagnetic steel sheets 702. Both sides of the PCB communicate in several points through tin vias 723. FIG. 23A shows the front face of the block 72. Three zones are identified on the copper layer of the upper face: zone 724 surrounds the via; other zone is the copper pad 726 where the contacts of the electronic component 701 are soldered; the third zone is the copper track 725 that connects the previous zones, 724 and 726. Furthermore, on the upper face of building block 72 is printed the silkscreen 727 (the symbol and value of the electronic component). The silkscreen is printed employing the known techniques to manufacture PCB's. The electronic component is positioned toward one edge of the block to leave more room to the silkscreen.

FIG. 23B shows the reverse of the block 72 where it is possible to distinguish two ferromagnetic plates 702 and their copper pads 722. Pad 722 is connected to the copper ring 724 that surrounds the via 723 by the copper track 725.

Although the building block from FIG. 23A and FIG. 23B is more complex than the block of the preferred embodiment, it has a clear advantage: the electronic component is visible and doesn't remain hidden under the PCB. That way the user has a more realistic experience of the circuit: it is possible to appreciate if the components heat up, to measure the voltage, the current, etc.

Figure 24A:
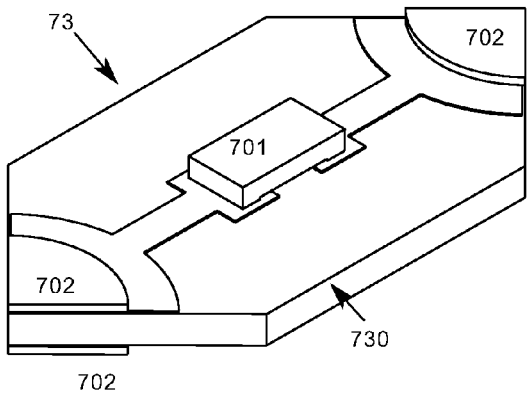
Figure 24B:
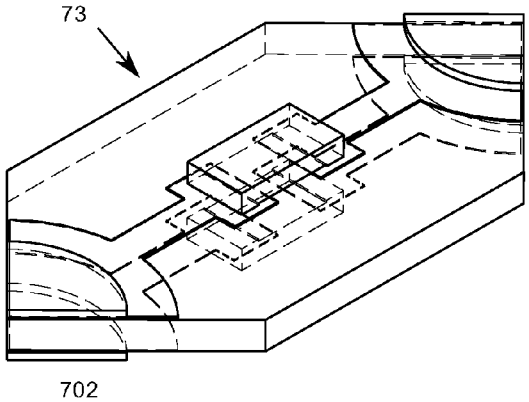

FIG. 24A and FIG. 24B show another kind of building blocks. The base of this kind of blocks is based on a double-sided PCB 730. Each of the sides of the PCB has its own electronic component 701 and its own ferromagnetic contact plates 702. Depending on which side of the building block faces downward, a different electronic component will be connected to the circuit. The silk screen printed on one side of the block informs about the component placed on the opposite side. This kind of blocks has no vias connecting the two sides of the PCB. Although it has not been illustrated, yet another embodiment is possible based on the previous type of blocks. In that embodiment the component and its contact plates are soldered on opposite sides of the PCB and communicate with each other through vias. The advantage is that the electronic component and its associated silk screen are on the same side.

Figure 25A:
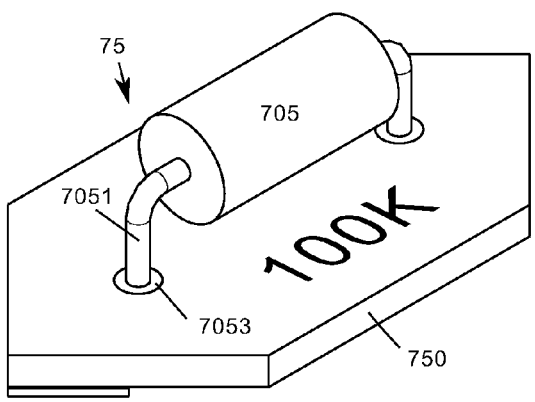
Figure 25B:
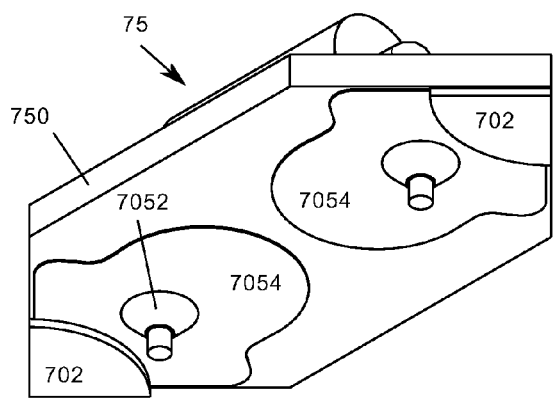

FIG. 25A and FIG. 25B show a fourth embodiment of the invention. In this embodiment the building block 75 is based on a single-sided PCB 750. The PCB 750 has plated through-holes 7053 to insert and solder the pins or the leads 7051 of an electronic component 705 that is not an SMD component.

FIG. 25B shows the lower side of the block 75. On that side can be seen the copper pads 7054 and copper traces to be placed in position by soldering the steel sheet plates 702. The figure also shows the tin meniscus 7052 that makes the joint between the lead and the copper pad.

Figure 26A:
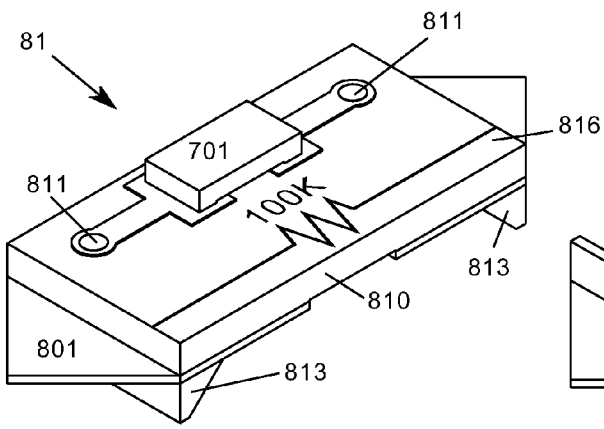
Figure 26B:
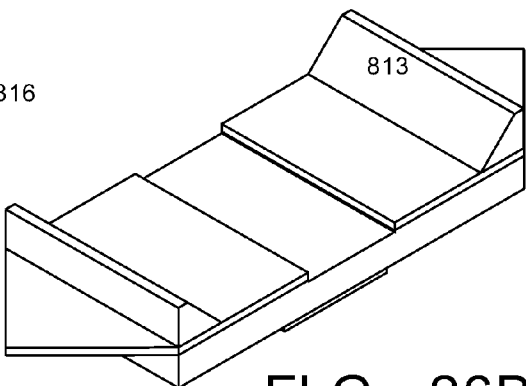
Figure 26C:
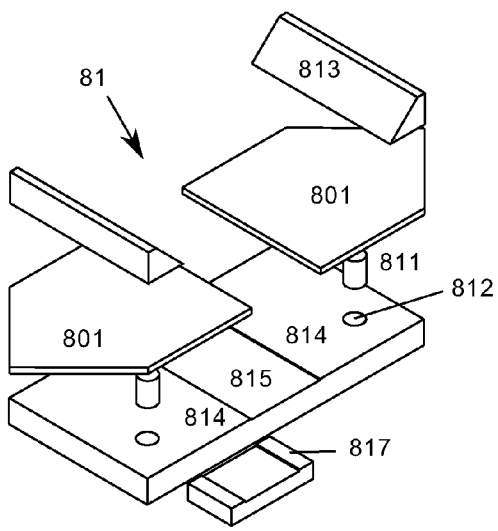

FIGS. 26A, 26B and 26C show another embodiment of the invention. The building blocks 81 have as its base a double-sided PCB. FIG. 26A shows the upper face of the PCB 810. On the upper side of the PCB is soldered the SMD electronic component 701 that communicates through two vias 811 with the lower side.

FIG. 26B shows the reverse of the building block of FIG. 26A. FIG. 26C is an exploded view of FIG. 26B and shows the via hole 812 of the tin via 811. On the lower side of the PCB 810 the copper pads 814 are formed to solder the ferromagnetic steel sheets 801. As these steel sheets 801 are bigger than the area that contacts the magnets 41 when the building block is in the correct position with respect to the magnet, disarranging forces arise. The problem of disarranging forces of this kind of blocks is illustrated on FIG. 11. Sheets 801, as well as sheets 702, are pointed 90°. The PCB 810 has a rectangular form, what makes its fabrication process easier, since its outline can be made by scoring and not only by tab routing, as is the case of the previous embodiment.

FIG. 26C shows how the copper pads 814 occupy almost all the surface of the lower side of the PCB. Only a narrow separation strip 815 between pads is present to break the electrical communication. The ferromagnetic contact plates can be considered as having two zones: one zone is covered by the PCB 810 and the other zone overhangs, protrudes from the PCB. The first zone has the same shape as the copper pad 814. In this particular embodiment, bigger forces arise in the joint plate-copper and in the joint copper-board substrate due to the fact that the plates act as a cantilever with a lever arm, as has been previously explained. For that reason it is necessary to maximise the surface of the copper pad and the contact surface between the plates 801 and their pads. Also on this figure it is possible to see the contacts 817 of the SMD component.

The embodiment illustrated by FIGS. 26A-C exhibit the disarranging forces problem. To solve that problem the blocks 81 include retaining stops 813, plastic or metallic. These stops can also be configured as a fold in the sheet itself. These retaining stops prevent the blocks from losing their desired position. The stops 813 are formed in or fixed to the side of the ferromagnetic sheet 801 that contacts the magnets. The stops 813 are elongated and are placed in perpendicular direction to the line that joins the tips of the plates. The stops 813 have a face or wall perpendicular to the steel sheet 801. This wall is separated from the tip of the steel sheet by a distance equal to the radius of the magnet 41, as represented on FIG. 26D.

Figure 26D:
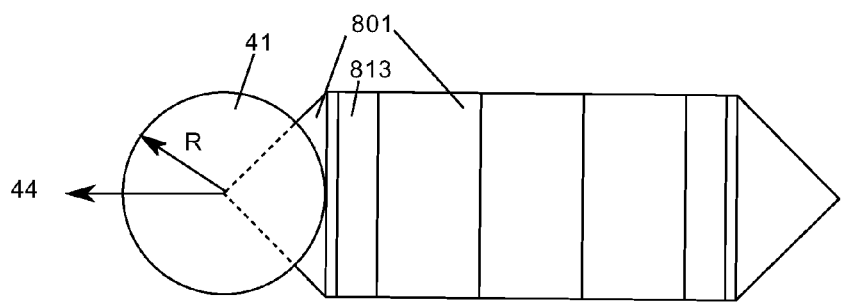

FIG. 26D shows a steel sheet 801 with its retaining stop 813 making contact against the wall of a magnet 41 and neutralizing the disarranging force 44.

Although the last embodiment exhibits the problem of the disarranging forces, it also has some important advantages. For example, since the steel sheets 801 have an uncovered part it is very easy to measure with the probe of a voltmeter. It is also very easy to connect cables, to make bypasses, etc. even when four blocks converge on a magnet.

Figure 27A:
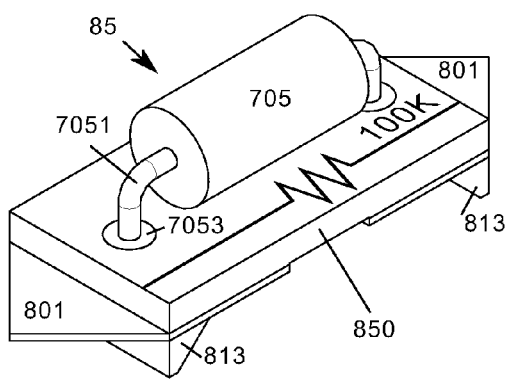
Figure 27B:
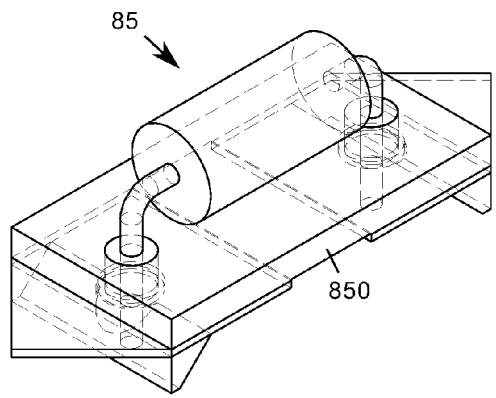
Figure 27C:
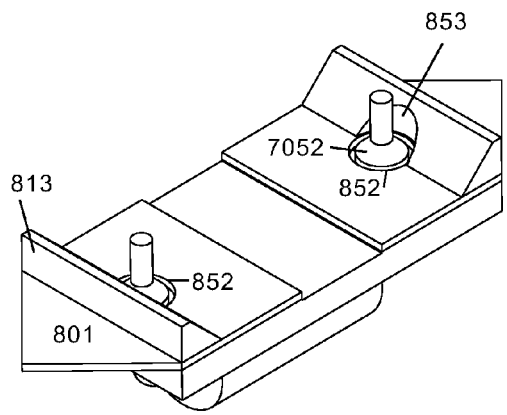

FIGS. 27A, 27B and 27C show a different embodiment of the invention with contact plates that overhang from the PCB. The building blocks of this embodiment 85 are very similar to the aforementioned blocks 81. The main difference is that the electronic components have leads or pins. These figures show a component 705 with two leads 7051. The leads are inserted and soldered to the plated through-holes of the PCB. The steel sheets have a hole 852 to let the pins or the leads pass through. These holes are slightly bigger than the tin meniscus 7052. For the same reason, the retaining stops 813 exhibit now a small recess 853.

FIGS. 28A to 29E show different jumpers. The jumpers are used to connect electrically two or more points of the grid of contacts, i.e. two or more magnets. The simplest jumper considered is a ferromagnetic steel sheet. For example, FIG. 29A shows a square steel sheet 802 to connect two adjacent magnets. This kind of jumpers feels disarranging forces and for that reason retaining stops must be used. FIGS. 29B and 29C show the jumper of FIG. 29A with retaining stops fixed to the steel sheet 802. FIG. 29C differentiates from FIG. 29B in that the points of the jumper that don't make contact with the magnets have been eliminated.

FIG. 29D and FIG. 29E show jumpers like the ones illustrated before, but connect magnets separated by a greater distance. FIG. 29D connects magnets of the same row or column which are separated by a node of the grid. FIG. 29E shows a jumper that connects two magnets of the grid of contacts placed on adjacent columns (or rows) but separated by a row (or column). The jumpers can be designed to connect two or more magnets, separated by different distances. The jumpers shown before are just examples and a skilled person could think of many other possibilities.

FIG. 28A and FIG. 28B show two jumpers based on a PCB. These jumpers are made following the preferred embodiment of the invention, i.e. with ferromagnetic steel sheets 702 that do not overhang. The PCB is single-sided and has copper pads 712 to solder the contact plates 702. These pads 712 are connected by the copper track 714.

FIGS. 30A, 30B, 30C and 30D show another embodiment of the invention that is very advantageous. The building blocks have ferromagnetic steel sheets 902 and 952 that overhang from the base PCB's 921, 911, 951 and 931. All these contact plates 902 and 951 overhang from the magnets 41 when the building blocks are in the correct position with respect to the magnets, i.e. with the tips of the contact plates on the centre of the magnets. For that reason disarranging forces appear which must be neutralized. In these building blocks the disarranging forces are neutralized by the PCB itself.

Figure 30A:
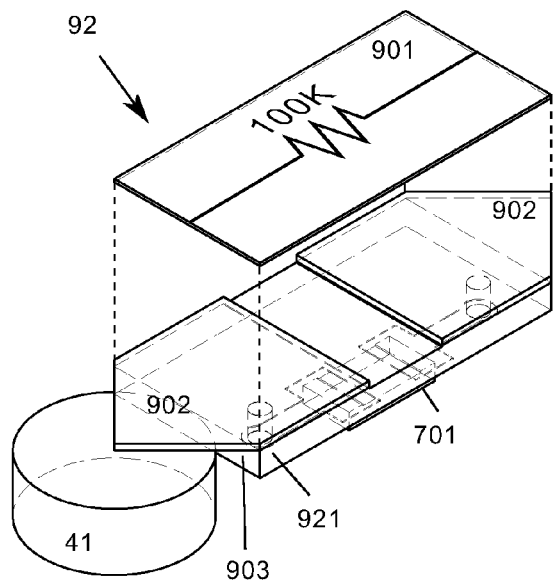

FIG. 30A shows an embodiment with a double-sided PCB 921. The electronic component 701 is an SMD component. The component 701 is soldered to the block 92 in a similar way to how it is soldered on FIGS. 26A, 26B and 26C. Also the connection of the contacts of the component 701 with its plates 902 through copper tracks and vias is similar to the one shown on those figures. The peculiarity of this embodiment is that the retaining stop that neutralizes the disarranging forces is the PCB itself. FIG. 30A illustrates this feature. The edge 903 of the PCB acts as a retaining wall perpendicular to the face of the steel sheet 902 that contacts with the magnet 41. The edge 903 is placed in perpendicular direction to the bisector of the angle of the tips of the contact plates. This edge 903 is placed at a distance of the tip equal to the radius of the cylinder of the magnet as explained in FIG. 26D. The silk screen with the symbol and value of the electronic component are printed on an insulating sheet 901 that is fixed to the plates 902. It is important to remark that in contrast contradistinction to what happens in FIGS. 26A-C, the electronic component is now underneath the PCB when the block is on its magnets. In that situation the block only shows its steel sheets. For that reason the silk screen cannot be printed on the PCB and an additional element 901 is necessary to show the symbol and value of the component.

Figure 30B:
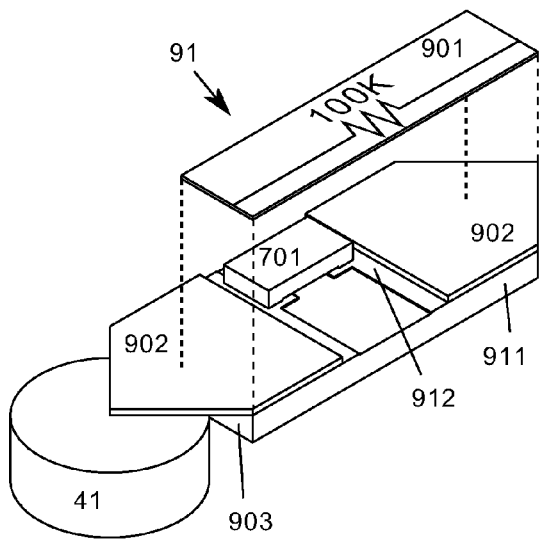

FIG. 30B shows another embodiment similar to the one illustrated on FIG. 30A. In this case the base is a single-sided PCB 911. The electronic component 701 as well as the contact plates 902 are soldered to the copper pads 912 of the only side of the PCB that has a copper layer. This block 91 also needs a sheet 901 to show the symbol and the value of the electronic component 701. The block 91 neutralizes the disarranging force with the edge 903 of the PCB in the same way as explained on FIG. 30A. In this block the electronic component is above the PCB when the PCB is on the magnets.

Figure 30C:
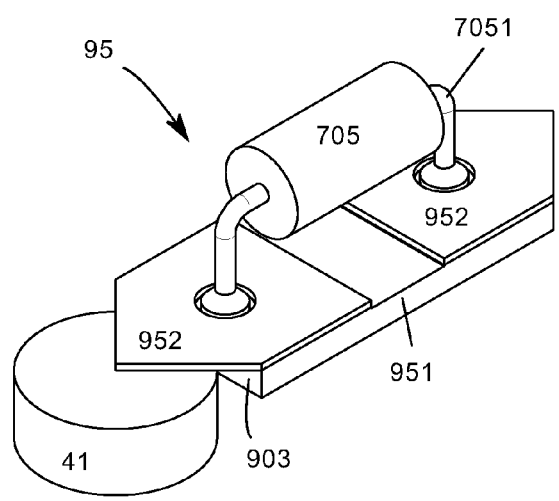

FIG. 30C shows another embodiment similar to the last two embodiments. The peculiarity of the building block 5 is that the component 705 is not SMD but has lead 7051. The plates of the block 95 have holes like the ones in block 85 of FIGS. 27A-C. The block 95 is based on a single-sided PCB 951. The plates 952 are soldered to the copper pads (not shown) of the PCB 951. The building block 95 neutralizes the disarranging forces with the edge 903 of the PCB, just like it happens on FIG. 30A.

Figure 30D:
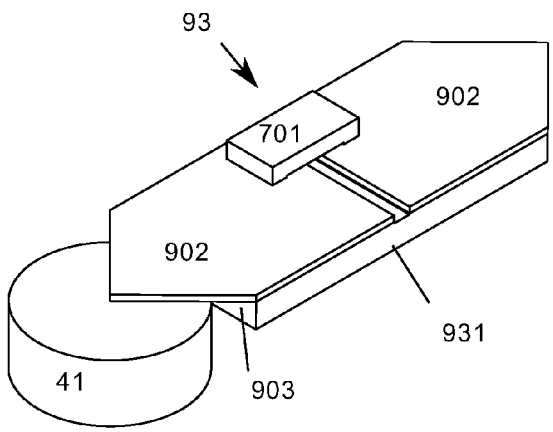

FIG. 30D shows a building block 93 with a feature that no other embodiment exhibits. The building block 93 is based on a single-sided PCB 931 that mounts the contact plates 902 in a similar way as blocks 91 and 92 do, but building block 93 does not mount the SMD electronic component on the PCB but rather on the ferromagnetic steel sheets 902, each contact is soldered to a different sheet 902. For that reason the plates 902 must be close so that the electronic component can touch both plates. In order to facilitate the soldering process the plates must be coated with a solderable material, for example tin. Although it has been omitted in the drawings, building blocks 93 and 95 need an insulating sheet 901 to carry the symbol and value of the electronic component.

Figure 31A:
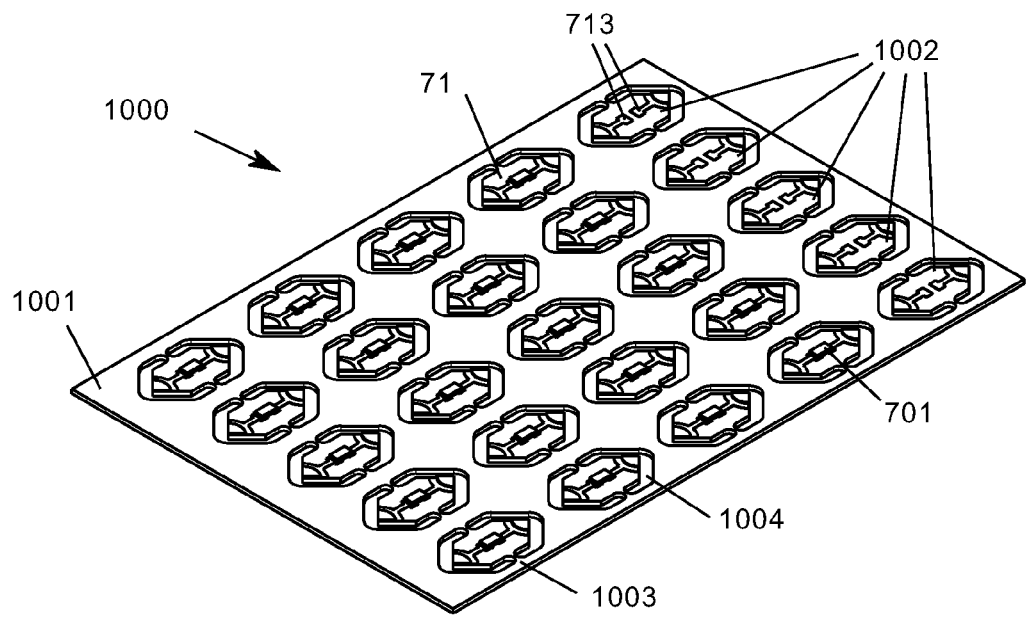
Figure 31B:
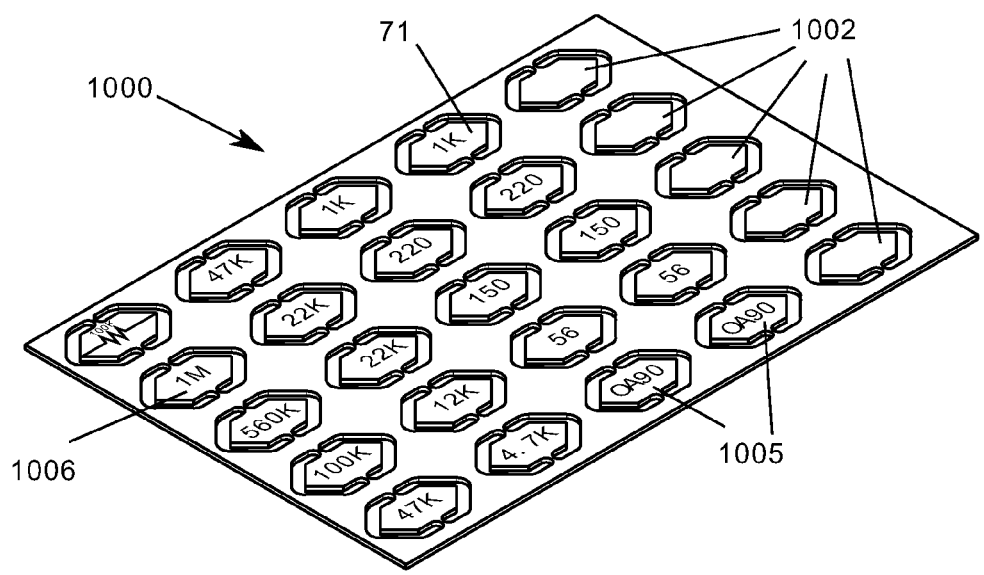

FIG. 31A and FIG. 31B show how the building blocks are delivered to the buyer, to the end user. The building blocks are panellized, i.e. the individual building blocks are attached to a large panel 1000. The building blocks so arrayed can be handled as larger units, allowing them to be easily mass fabricated, populated, and soldered using standard processes. The panels are either tab-routed or V-scored so that when the assembly processes are complete the individual pieces can be snapped apart. With tab-routing small slivers of the panel are removed with a router bit and the individual PCBs are held together with the remaining tabs. With V-scoring a V-shaped groove is cut partway into the panel from one or both sides of the panel over its full length. The building blocks are grouped in different panels depending on the type of PCB they are based on. For example, all the blocks that are based on single-sided PCB's are panellized in a panel that is a large single-sided PCB. That large PCB has all the assortment of single-sided blocks that a kit includes, for example: resistors, jumpers, small capacitors, etc. Building blocks that are based on double-sided PCB's are contained in another panel. This panel contains lager blocks like electrolytic capacitors, LED's, push buttons, etc.

FIGS. 31A and 31B show a panel 1000 that contains several building blocks 71 of the preferred embodiment. Each block 71 is held to the panel with two tabs 1003. The buyer must snap these blocks apart by breaking the tabs. The path followed by the router bit is indicated with the references 1004.

FIG. 31A and FIG. 31B show a very specific embodiment of the invention that shouldn't be construed narrowly. Only linear building blocks have been represented, like resistors 1006 and diodes 1005. Linear building blocks are those that link two points of the same row or column. Furthermore, only simple blocks are represented. No component with more than two contact plates have been represented, like for example transistors, integrated circuits, etc. However, it is important to notice that the panel 1000 includes some empty blocks 1002. These blocks are very useful, as they permit the buyer to solder the electronic components that he desires and that are not supplied with the kit. The empty blocks 1002 represented can only mount SMD components (by soldering to the copper pads 713). However, it is also possible to provide empty blocks for lead or pin components, or even blocks that can mount a component with leads and an SMD. On FIG. 31B the reverse of the blocks is represented. In that figure it is possible to see the silkscreen printed on the PCB.

Another problem that can appear in any of the aforementioned embodiments is this: When a block mounts an electronic component with more than three contacts or leads, it can happen that one or more contact plates don't touch its corresponding magnet. The explanation for this problem is that due to fabrication errors there might be one or more plates that are not in the same plane as the rest of the plates.

To solve this problem it is necessary to resort to the embodiments with overhanging contact plates (801, 902, 951). The embodiments without overhanging plates won't solve this problem easily because the PCB is not very flexible. In order to be able to absorb all these potential errors it is necessary to use overhanging plates of high flexibility in the direction perpendicular to the plane of the plates. This flexion is caused by the magnetic attraction exerted by the magnets. To improve that flexion it is necessary to create a weakening in the plates.

Figure 32A:
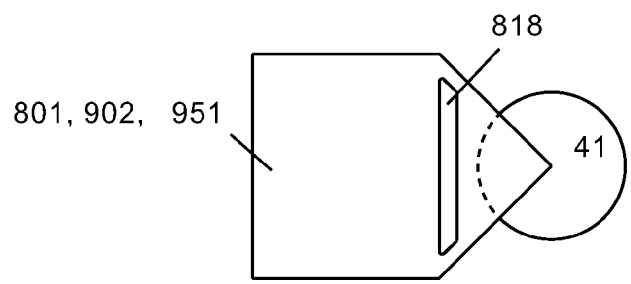
Figure 32B:
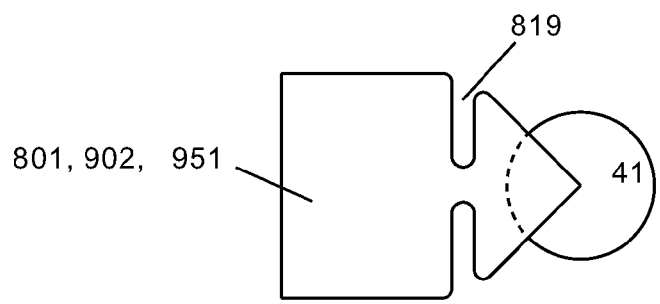
Figure 32C:
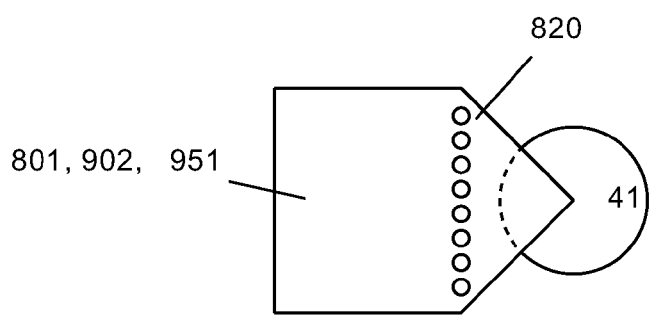

FIGS. 32A, 32B and 32C show three weakening solutions. FIG. 32A shows a weakening 818 that is an elongated slot 818 running in the perpendicular direction to the bisector of the angle of the tip. In FIG. 32B the weakening 819 is made with two notches that create a waist in the plate. FIG. 32C shows a weakening made with a lining of drills 820 arranged in a row, in a direction perpendicular to the bisector of the angle of the tip.

I claim:

1. Building block for constructing educational electronic circuits comprising:
    a) a base printed circuit board (PCB) (710, 720, 730, 810, 850, 911, 921, 931, 951) with copper pads (713, 726, 912), plated through-holes (7053) or ferromagnetic steel sheets (902) in which it is possible to solder an electronic component (701, 703, 705),
    b) ferromagnetic steel sheets (702, 801, 902, 952) soldered to the PCB to fix the building block by magnetic attraction to magnets (41) whose surface is electrically conducting, wherein said steel sheets are contact plates for the building block that connect the electrically conducting surface of the magnets (41) with points of the PCB (712, 722, 7054, 814, 912) and wherein copper tracks of the PCB connect said points with the copper pads (713, 726, 912), plated through-holes (7053) or ferromagnetic steel sheets (902) in with it is possible to solder an electronic component (701, 703, 705),
    wherein
    c) each ferromagnetic steel sheet (702, 801, 902, 952) has a shape formed by several sides, wherein a first side (7022) of said shape is the result of rotating 90° a second side (7021) of said shape around a rotation center (7023) that is a vertex of the steel sheet or an external point to the steel sheet,
    d) the ferromagnetic steel sheets (702, 801, 902, 952) have a shape, such that when a face of a steel sheet of a building block rests by its center of rotation (7023) on a base of one of said magnets (41) wherein said magnet (41) is a right prism and wherein the bases of said prism are a circle or a regular polygon with a number of sides multiple of four, a magnetic attraction between the magnet and the steel sheet arises that takes the steel sheet to a position with respect to said magnet that is an equilibrium position in which the magnetic attraction disappears or is neutralized by a retaining stop (813, 903) that protrudes from the face of the steel sheet (801, 802, 902, 952) that contacts the permanent magnet (41), and in said equilibrium position said center of rotation (7023) of said steel sheet coincides with the geometric center of said circle or with the geometric center of said regular polygon of the base of said magnet (41).

2. Building block (71, 72, 73, 75) according to claim 1 characterised in that:
    a) the shape of the ferromagnetic steel sheets (702) is such that when the steel sheets rest on a base of a magnet (41) with the center of rotation (7023) on the geometric center of that base of the magnet (41), a part of the steel sheets overhangs from the magnet.

3. Building block (71,91) according to claim 1 characterised in that:
    a) the base is a single-sided PCB (710, 911) that has the ferromagnetic steel sheets (702, 902) soldered to it and that comprises copper pads (713, 912) to solder a surface-mount device (SMD) (701, 703).

4. Building block (72, 81, 92) according to claim 1, characterised in that:
    a) the base is a double-sided PCB (720, 810, 921)
    b) the ferromagnetic steel sheets are soldered to one side of the PCB and on the opposite side are the copper pads (726) to receive an SMD electronic component (701, 703)
    c) both sides of the PCB are connected by vias (723, 811).

5. Building block (73) according to claim 1, characterised in that:
    a) the base is a double-sided PCB (730)
    b) each side has its own ferromagnetic steel sheets (702) and each side comprises copper pads to receive an SMD electronic component (701, 703)
    c) the copper pads to receive a component are directly connected to the steel sheets of their own side or to the steel sheets of the opposite side through vias.

6. Building block (75) according to claim 1, characterised in that:
    a) the base is a single-sided PCB (750) with plated through-holes (PTH) (7053) in which it is possible to solder the pins or the leads (7051) of an electronic component (705)
    b) the component (705) is mounted on the opposite side to the ferromagnetic steel sheets (702)
    c) the plated through-holes (7053) are connected to the ferromagnetic steel sheets by copper tracks that are on the same side as the steel sheets.

7. Building block according to according to claim 1 characterised in that:
    a) the steel sheets of at least one side of the PCB are directly connected to each other.

8. Building block according to according to claim 1 characterised in that:
    a) the ferromagnetic steel sheets overhang from the PCB (801, 902, 951) with a slot or line of holes (818, 819, 820) to increase the flexibility of the tips of the steel sheets in the direction perpendicular to the plane of the steel sheets, so that the building blocks with more than three steel sheets can absorb small flatness errors from the magnets (41) or from the steel sheets (801, 902, 951).

9. Building block according to claim 1 characterised in that:
    a) comprises an electronic component (701, 703, 705) soldered to the copper pads (713, 726, 912), plated through-holes (7053) or ferromagnetic steel sheets (902) on which it is possible to solder an electronic component.

10. Kit of building blocks for constructing educational electronic circuits comprising
    a) a ferromagnetic base plate (10),
    b) a group of magnets (40, 41) of the same shape and size, attached to the plate (10) by magnetic attraction; each magnet (40, 41) is a right prism and comprises two bases of the same shape and size; the bases of the prism are circles or regular polygons of a number of sides multiple of four; the surface of the magnets (40, 41) is electrically conducting, c) a plurality of building blocks according to any preceding claim, that can be detachably mounted on the magnets (40, 41), each magnet (41) electrically connecting the steel sheets of the building blocks that rest on said magnet (41), d) electrical jumpers and a power supply, wherein e) the ferromagnetic base plate (10) has an insulating coating, and on the upper side of the plate, a grid (11) is printed with the silhouette of a magnet (40, 41) in each node of the grid, that grid representing where magnets (41) can be placed to support building blocks and to make an electrical contact among the steel sheets of the building blocks that the magnet supports, the grid (11) indicates where magnets (41) can be placed when an electrical circuit is being constructed without the aid of a circuit diagram sheet (20), f) on the base plate (10) it is possible to place a sheet (20) with the diagram (21) of the circuit to construct, and on the base plate (10), or on the pile formed by the base plate (10) and the sheet (20), an electrically insulating, smooth, transparent plastic sheet (30) rests, being the shape of the sheet (30) equal to the shape of the plate (10) and being the plastic sheet (30) attached to the base plate (10) by the force that the magnets (40, 41) that rest on the sheet (30) exert on the sheet attracted by the base plate (10).

11. Kit of building blocks for constructing educational electronic circuits according to claim 10 characterized in that:

a) the plurality of building blocks of the kit are panellized in PCB's (1000) that contain several building blocks and that act as a frame, b) building blocks based on single-sided PCB's (71, 75, 85, 91, 93, 95) are panellized in a large single-sided PCB, c) building blocks based on double-sided PCB's (72, 73, 81, 92) are panellized in a large double-sided PCB, d) each block (71) is held to a frame panel (1000) by two tabs (1003) that can be snapped apart by breaking said tabs by hand, e) symbols representing electronic components are printed on each building block.

12. Kit of building blocks for constructing educational electronic circuits according to claim 10 comprising a transparent perforated plastic sheet (50) with a grid of circular holes, wherein said grid of holes has the same shape and size as said grid of nodes (11) to prevent the movement of the magnets (41) when the magnets are placed on indicated positions (22) of a circuit diagram (21).

\* \* \* \* \*